(12) United States Patent
Kawamoto et al.

(10) Patent No.: US 8,161,129 B2
(45) Date of Patent: Apr. 17, 2012

(54) COMMUNICATION SYSTEM, NETWORK SYSTEM, INFORMATION CONTROLLER AND TERMINAL EQUIPMENT

(75) Inventors: Yoji Kawamoto, Tokyo (JP); Hirofumi Kawamura, Kanagawa (JP); Motomasa Futagami, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 11/463,555

(22) Filed: Aug. 9, 2006

(65) Prior Publication Data

US 2007/0201358 A1    Aug. 30, 2007

Related U.S. Application Data

(63) Continuation of application No. 09/593,107, filed on Jun. 13, 2000, now abandoned.

(30) Foreign Application Priority Data

Jun. 24, 1999  (JP) .................................. P11-178994
Jun. 24, 1999  (JP) .................................. P11-178995

(51) Int. Cl.
*G06F 15/16*   (2006.01)

(52) U.S. Cl. .............. 709/217; 709/220; 707/3; 705/44; 370/392

(58) Field of Classification Search .................. 709/217, 709/220; 707/3; 705/44; 370/392
See application file for complete search history.

(56) References Cited

U.S. PATENT DOCUMENTS

| 5,485,634 | A | 1/1996 | Weiser et al. |
| 5,493,692 | A | 2/1996 | Theimer et al. |
| 5,564,070 | A | 10/1996 | Want et al. |
| 5,793,630 | A | 8/1998 | Theimer et al. |
| 5,812,865 | A | 9/1998 | Theimer et al. |
| 6,049,787 | A * | 4/2000 | Takahashi et al. ............... 705/44 |
| 6,819,670 | B1 * | 11/2004 | Fenner .......................... 370/392 |
| 2008/0222107 | A1 * | 9/2008 | Maluf ............................... 707/3 |

FOREIGN PATENT DOCUMENTS

| JP | 09-238158 | 1/1997 |
| JP | 09-121335 | 5/1997 |
| JP | 10-322397 | 4/1998 |
| JP | 11-041436 | 2/1999 |
| JP | 2000-250877 | 2/1999 |
| JP | 11-168498 | 6/1999 |

OTHER PUBLICATIONS

Japanese Office Action, dated Jan. 7, 2008 (2 pages).
Japanese Office Action, dated Jan. 11, 2008 (2 pages).

* cited by examiner

*Primary Examiner* — Tammy Nguyen
(74) *Attorney, Agent, or Firm* — SNR Denton US LLP

(57) ABSTRACT

Information of a terminal equipment used by a user among the pieces of terminal equipment connected to a network is registered in prescribed registering means and a transmission path from the terminal equipment of a transmitter to the terminal equipment of a receiver is determined based on the registered information of the terminal equipment, so that the user can assuredly transmit the information to the terminal equipment of the receiver in the transmission path suitable for the information without any consciousness of the user. The information of the terminal equipment used by a user and the terminal equipment connected to the terminal equipment used by the user among the pieces of terminal equipment connected to the network is registered in prescribed registering means together with information for identifying the user as available environmental information, and provided information is transmitted to the terminal equipment specified by the registered available environmental information.

4 Claims, 18 Drawing Sheets

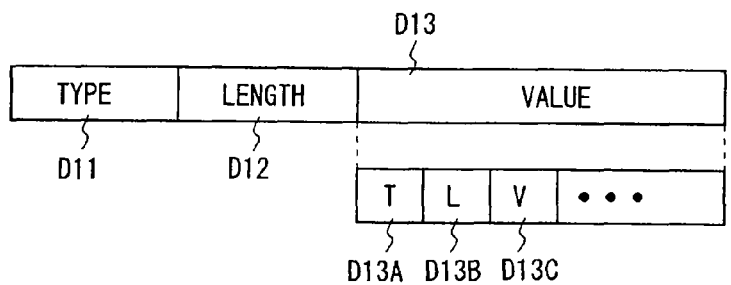

```
00 : NETWORK CONNECTION INFORMATION   CERTIFIED ID, PASSWORD···
01 : NETWORK ADDITIONAL INFORMATION   GROUP ID, PASSWORD
02 : PERSONAL INFORMATION             TELEPHONE DIRECTORY DATA, ADDRESS
                                      BOOK DATA, SCHEDULE DATA···
03 : INFORMATION FOR EACH TERMINAL    TERMINAL ATTRIBUTES OF TELEVISION,
                                      PC, CELLULAR PHONE, ETC.
                                      MEDIA ATTRIBUTES OF TEXT, STATIC
                                      IMAGE, MOVING IMAGE, VOICE, MUSIC, ETC.
                                      FORMAT OF HTML, GIF, JPEG, MPEG, MP3,
                                      ATRAC, ETC.
04 : ADDITIONAL INFORMATION
```

FIG. 15

COMMUNICATION SYSTEM, NETWORK SYSTEM, INFORMATION CONTROLLER AND TERMINAL EQUIPMENT

CROSS REFERENCE TO RELATED APPLICATIONS

This is a continuation of U.S. application Ser. No. 09/593,107, filed on Jun. 13, 2000, now abandoned which is incorporated herein by reference to the extent permitted by law.

BACKGROUND OF THE INVENTION

1. Field of the Invention

The present invention relates to a communication system, an information controller, a network system, and a terminal equipment and more particularly, is suitably applied to a communication system, a network system, an information controller and a terminal equipment for supplying various kinds of information to a user employing, for instance, a portable terminal equipment through a terminal equipment existing in the vicinity of the user.

2. Description of the Related Art

Conventionally, in the case where a user has employed a variety of terminal equipment connected to a network, the user has connected his terminal equipment to a server on the network and has received various information from the server.

In this case, the user has registered the terminal equipment used by himself and the user using it in the server, so that the server can confirm the terminal equipment to which it needs to transmit information and the user employing the terminal equipment.

However, in the above described network system, it has been necessary for the user to register the terminal unit used by himself or herself in the server every time he or she uses the terminal equipment, so that its maneuverability has been undesirably deteriorated.

SUMMARY OF THE INVENTION

In view of the foregoing, an object of the present invention is to provide a communication system and an information controller capable of specifying a terminal equipment used by a user, in other words, the receiver of information in a server side.

The foregoing object and other objects of the invention have been achieved by the provision of a network system, and a terminal equipment in which the information of a terminal equipment used by a user in the terminal equipment connected to a network is registered in prescribed registering means and a transmission path from the terminal equipment of a transmitter to the terminal equipment of a receiver is determined on the basis of the registered information of the terminal equipment. Therefore, the user can assuredly transmit the information to the terminal equipment of the receiver in the transmission path corresponding to the information without the consciousness of the user.

Further, according to the present invention, the user registers the information of a terminal equipment used by the user and a terminal equipment connected to the terminal equipment used by the user in the terminal equipment connected to the network in prescribed registering means together with information for identifying the user as available environmental information and transmits provided information to the terminal equipment specified by the registered available environmental information, so that the environment of the terminal equipment used by the user can be readily grasped.

Accordingly, the provided information can be transmitted to the terminal equipment corresponding to the provided information in the terminal equipment environment where the user is present and the user can surely read the provided information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 15 is a diagrammatic view showing data format in the memory card;

DETAILED DESCRIPTION OF THE EMBODIMENT

Figure 1:
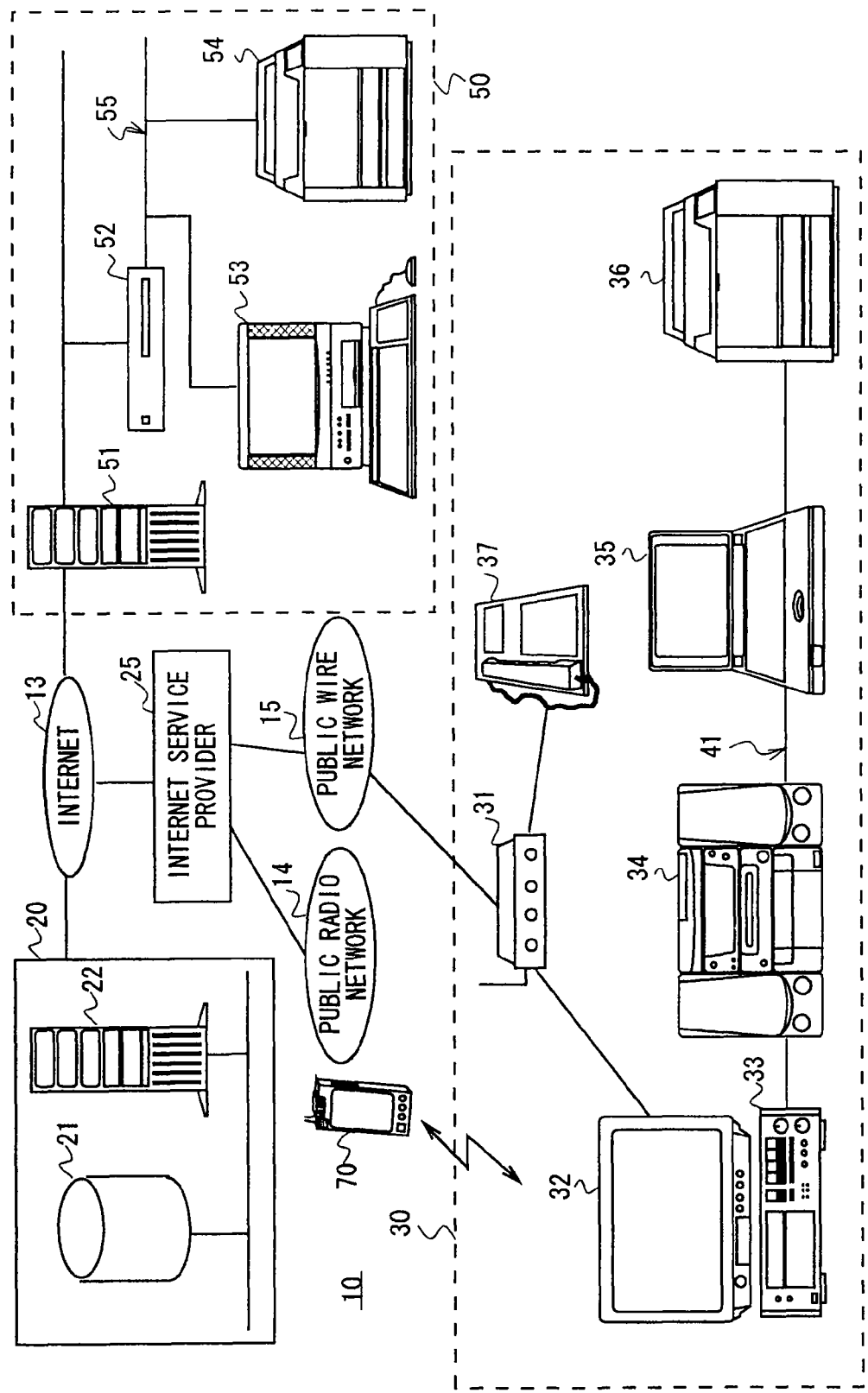
FIG. 1 is a diagrammatic view showing the entire configuration of a network system according to the present invention.

Preferred embodiments of this invention will be described with reference to the accompanying drawings:

In FIG. 1, reference numeral 10 generally denotes a network system. An Internet service provider 25, a server system 20 and a company network system 50 formed by using a Local Area Network (LAN) in a company or the like are connected together via the Internet 13.

To the Internet service provider 25, is connected a domestic network system 30 through a public wire network 15 such as a Public Switched Telecommunication Network (PSTN) or an Integrated Service Digital Network (ISDN) or the like.

The domestic network system 30 is designed to connect a facsimile telephone set 37 and a television set 32 to the public wire network 15 through a communication interface 31 as interface means such as a Modulator-Demodulator (MODEM).

To the television set 32, connected are a video tape recorder 33, an audio reproducing system 34, a personal computer 35, a printer 36 and the facsimile telephone set 37 by a data bus 41 of, for instance, IEEE1394 standard. Therefore, respective terminal equipment (the television set 32, the video tape recorder 33, the audio reproducing system 34, the personal computer 35, the printer 36 and the facsimile telephone set 37) can have access to the Internet service provider 25 through the public wire network 15, respectively, and further can have access to the server system 20 through the Internet 13.

Further, the company network system 50 has a personal computer 53 and a printer 54 connected together by the LAN 55 and these terminal equipment are connected to the Internet 13 through a fire wall 51 and a router 52 and are designed to transmit and receive information between the Internet 13 and them on the basis of a communication system employing a Transmission Control Protocol/Internet Protocol (TCP/IP). Accordingly, the terminal equipment of the company network system 50 can respectively have access to the Internet service provider 25 and the server system 20.

The server system 20 has a server computer 22 and a data base 21. The server computer 22 is adapted to register the personal information of a user, a terminal equipment which is being used by the user and other usable terminal equipment connected to the terminal equipment which is being used in the data base 21.

Here, all or some of a plurality of terminal equipment provided in the domestic network system 30 or the company network system 50 are provided with a local radio interface for performing a local radio communication between a cellular phone 70 peculiarly possessed by the user and the local radio interface. When the user having the cellular phone 70 comes near to the terminal equipment, the terminal equipment registers in the server system 20 a state that the user is located in a position where he can use the terminal equipment.

Figure 2:
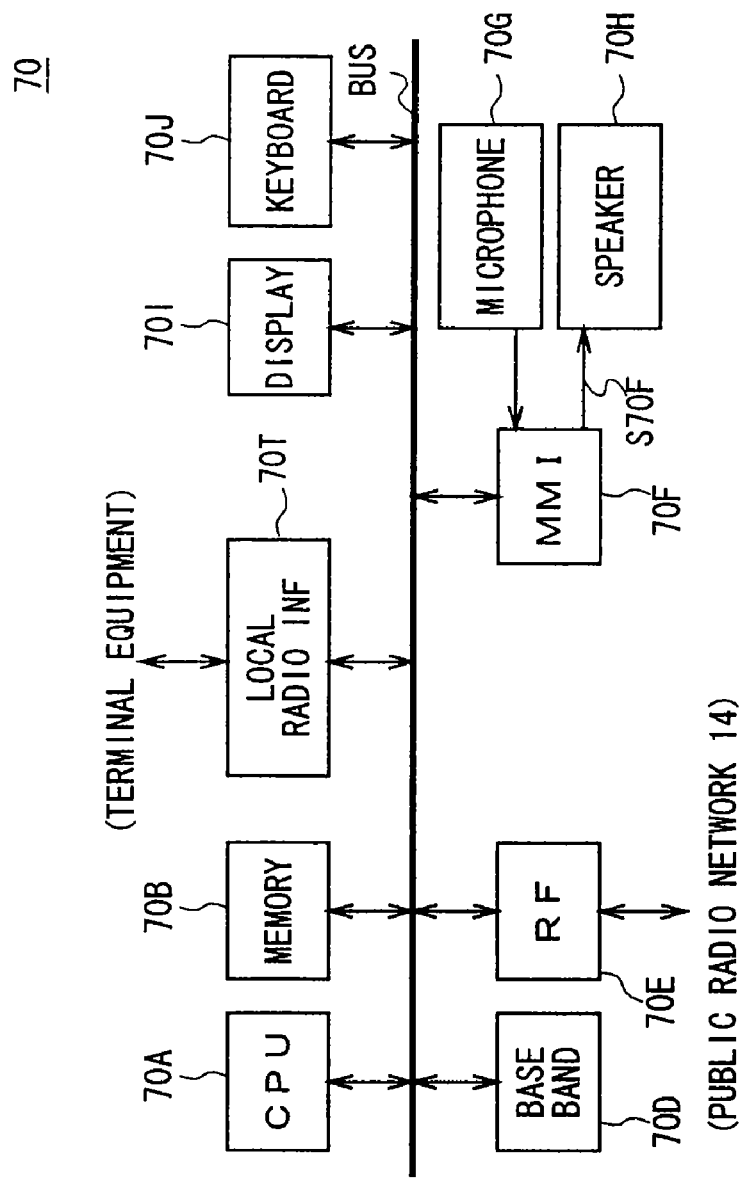
FIG. 2 is a block diagram showing the configuration of a cellular phone.

Specifically, FIG. 2 shows a configuration of the cellular phone 70 in which a CPU 70A, a memory 70B, a transmitting and receiving circuit (RF) 70E for transmitting and receiving signals to and from the communication interface 31, a base band processing part 70D for converting a Radio Frequency (RF) signal received in the transmitting and receiving circuit 70E into a base band signal and converting the base band signal to be transmitted into an RF signal, a Man Machine Interface (MMI) 70G as the interface of a microphone 70G and a speaker 70H, a display 70I and a keyboard 70J are connected to a data bus.

The CPU 70A is designed to execute various kinds of operations on the basis of operation programs stored in the memory 70B and to control respective circuits in accordance with the operations. The contents of various types of operations of the CPU 70A are displayed on the display 70I composed of a liquid crystal panel or the like as required.

When the user inputs the telephone number of a desired called party, the keyboard 70J transmits data indicating the telephone number to the CPU 70A. The CPU 70A transmits a connection request to the called party represented by the telephone number inputted by the user through the transmitting and receiving circuit 70E. At this time, a public radio network 14 (FIG. 1) connects a line to the called party in accordance with the response of the called party. When the line is connected to the called party, the transmitting and receiving circuit 70E supplies an RF signal received from the called party through an antenna (not shown) to the base band processing part 70D in which the RF signal is converted into the base band signal. The base band processing part 70D supplies the base band signal thus converted to the MMI 70F, so that an audio signal received from the called party is outputted from the speaker 70H as a voice.

Further, when the user inputs the voice through the microphone 70G, the MMI 70F supplies the input audio signal supplied from the microphone 70G to the base band processing part 70D in which the base band signal is converted into the RF signal. Then, the base band processing part 70D transmits the converted RF signal to the public radio network 14 (FIG. 1) through the transmitting and receiving circuit 70E to transmit the RF signal to the called party of which the line is connected. Thus, the user employing the cellular phone 70 can transmit and receive the conversation or various kinds of information between the called party and the user.

In this case, the cellular phone 70 is provided with a local radio interface 70T for performing a specific local radio communication between the respective terminal equipment of the domestic network system 30 and the company network system 50. The local radio interface 70T receives identifier information peculiar to a network, which is usually broadcast, from the terminal equipment. The CPU 70A detects the current position of the cellular phone 70 on the basis of the identifier information received in the local radio interface 70T.

In other words, at least one terminal equipment of the respective terminal equipment in the domestic network system 30 and at least one terminal equipment of the respective terminal equipment in the company network system 50 are provided with the local radio interface for performing the local radio communication with the cellular phone 70 to constantly broadcast the identifier information peculiar to the network.

In case of this embodiment, in the domestic network system 30, the television set 32 has a local radio interface. In the company network system 50, the personal computer 53 has a local radio interface.

Figure 3:
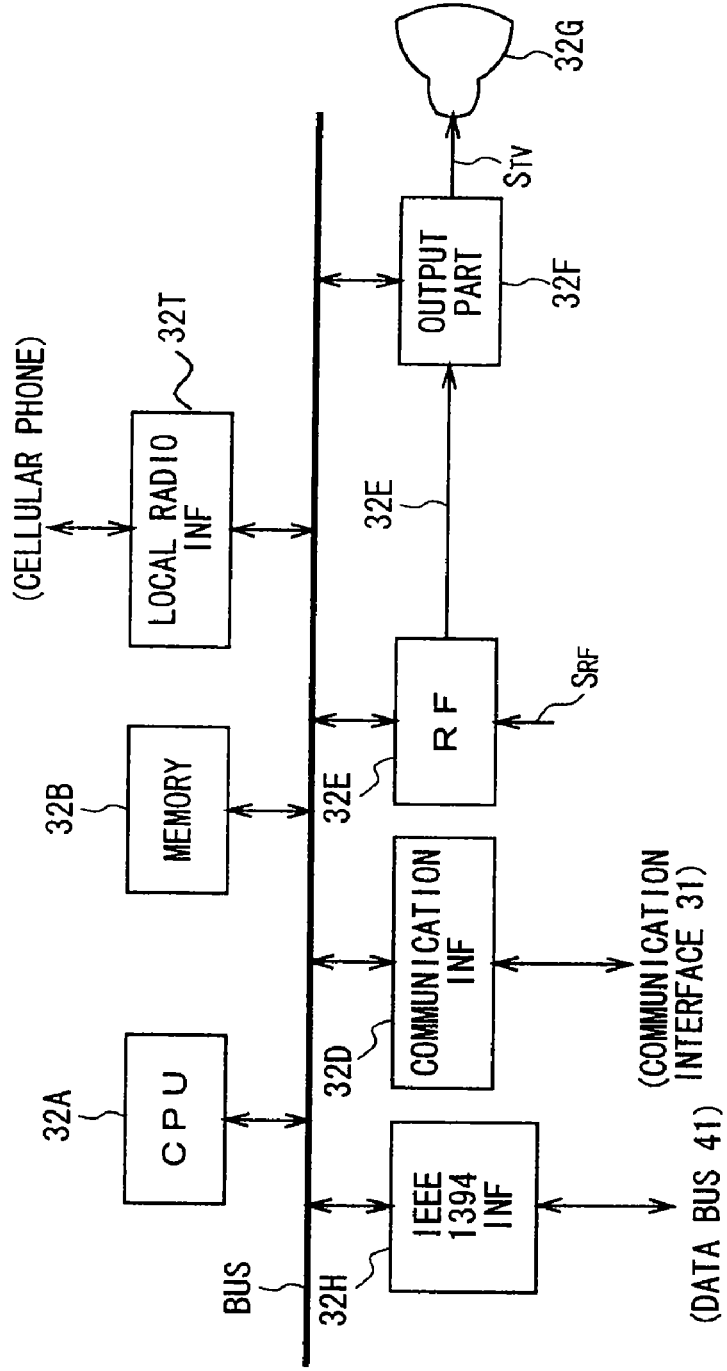
FIG. 3 is a block diagram showing the configuration of a television set.

Specifically stated, in the television set 32, a CPU 32A, a memory 32B, a communication interface 32D for transmitting data to and receiving from the communication interface 31 (FIG. 1), a receiving circuit (RF) 32E, a local radio interface 32T for transmitting data to and receiving it from the cellular phone 70 and an output part 32F connected to the data bus BUS, as shown in FIG. 3. The CPU 32A is adapted to carry out various kinds of operations in accordance with operation programs stored in the memory 32B and to control the respective circuits in accordance with the operations.

The Radio Frequency (RF) 32E receives a television broadcast wave SRF received by the antenna (not shown) and transmits a receiving signal S32E thus received to the output part 32F. The output part 32F applies an intermediate frequency amplification processing and a video detection processing or the like to the receiving signal S32E to generate a television video signal STV and transmit it to a Cathode Ray Tube (CRT) display 32G. Thus, the television broadcast received by the RF 32E is visually displayed on the display screen of the CRT 32G.

Further, the television set 32 receives various kinds of contents information supplied from the Internet service provider 25 through the public wire network 15 and the communication interface 31 in the communication interface 32D, stores them in the memory 32B, supplies them to the CRT 32G through the output part 32F and visually displays them thereon.

Here, the local radio interface 32T of the television set 32 constantly broadcasts identifier information peculiar to the domestic network 30 to which the television set 32 is connected to inform the cellular phone 70 having the local radio interface 70T that the position thereof is located within an area in which the terminal equipment of the domestic network system 30 can be used.

Figure 4:
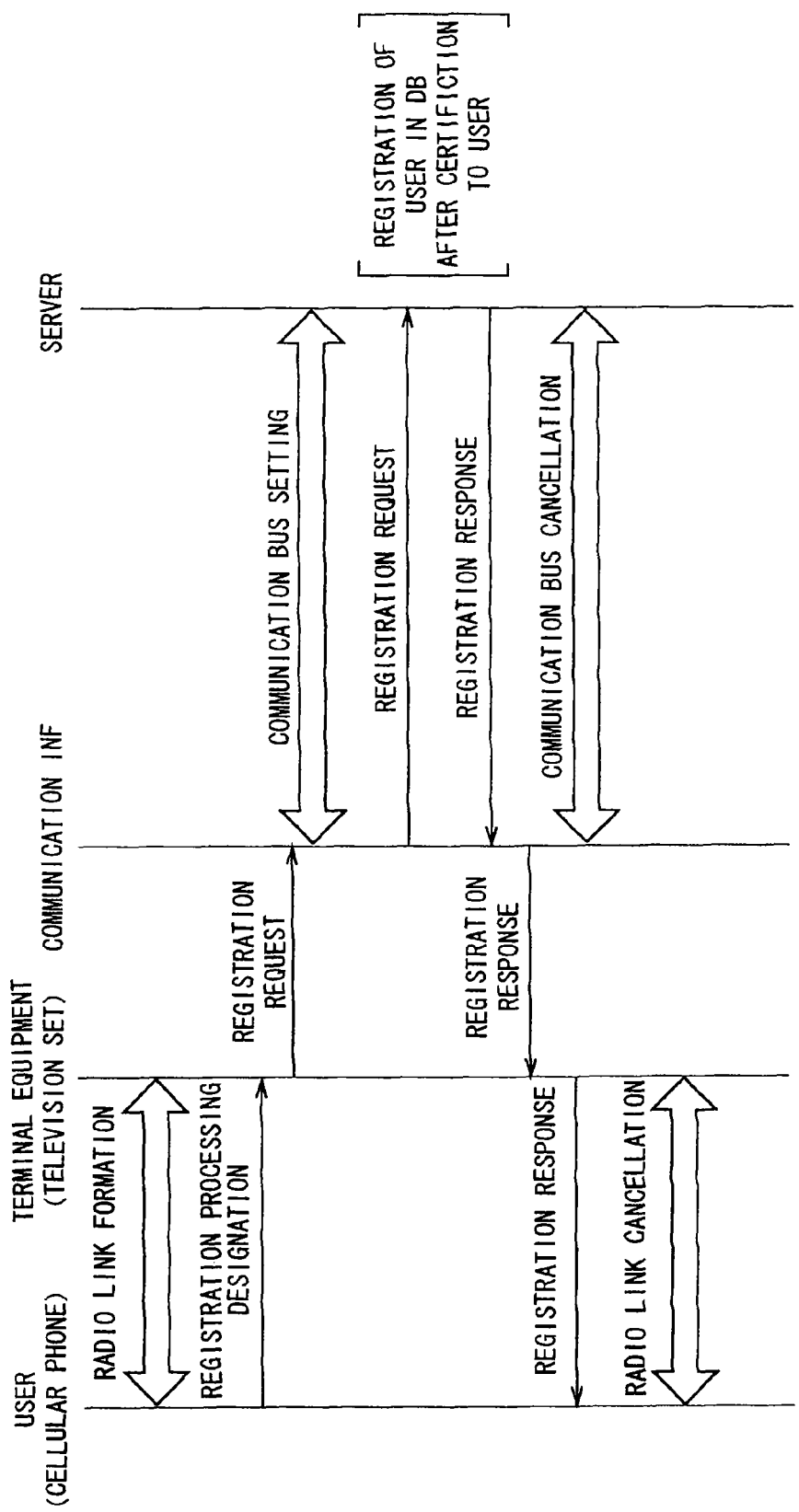
FIG. 4 is a diagrammatic view showing a registration sequence to a server.

In the cellular phone 70, when the user operates the keyboard 70J (FIG. 2) to designate a registration request for the server system 20, the CPU 70A of the cellular phone 70 executes a registration processing to the server shown in FIG. 4.

Specifically, referring to FIG. 4, when the execution of a registration request processing is inputted and designated to the cellular phone 70, the CPU 70A (FIG. 2) of the cellular phone 70 receives the identifier information broadcasted from the television set 32 in an area where the cellular phone 70 exists at present to ensure a radio communication path between the local radio interface 32T (FIG. 3) of the television set 32 and the CPU 70A.

Then, the CPU 70A transmits registration processing designating information for requesting the server system 20 to execute the registration processing to the television set 70 as a communication object whose radio communication path is ensured at that time. The CPU 32A of the television set 32 receiving the registration processing designating information from the cellular phone 70 transmits registration request information to the communication interface 31 of the domestic network system 30.

In the registration request information, there are included a user ID and a password contained in the registration processing designating information transmitted from the cellular phone 70, the terminal equipment ID of the television set 32 read from the memory 32B of the television set 32, the ID information (terminal equipment ID) of a usable terminal equipment of other terminal equipment (the video tape recorder 33, the audio reproducing system 34, the personal computer 35, the printer 36 and the facsimile telephone set 37) of the domestic network system 30 connected to the television set 32 by the IEEE1394 data bus 41 and individual terminal equipment information for each terminal equipment. The terminal equipment information includes address, equipment classification, and terminal capacity information (the decode system, the display capacity, etc. of a terminal equipment) proper to each terminal equipment and the owner information of each terminal equipment. The owner information is employed in case of requesting an accounting to the user in accordance with the use of the terminal equipment.

In this connection, when the memory card 60 is inserted, the CPU 32A of the television set 32 is adapted to receive respective terminal equipment IDs from other terminal equipment connected by the IEEE 1394 data bus 41 through the data bus 41 and an IEEE 1394 interface 32H, and to include them in the registration request information.

The communication interface 31 receiving the above described registration request information forms a communication path between the server system 20 and the interface 31 through the public wire network 15, and then, transmits the registration request information to the server system 20.

In this case, after the communication interface 31 forms the communication path between the server system 20 and the interface 31, the registration request information can be directly transmitted to the server system 20 from the terminal equipment (for example, the television set 32).

The server computer 22 of the server system 20 retrieves the user ID included in the registration request information among a plurality of user IDs previously registered in the data base 21. When there exists a corresponding user ID, the server computer 22 decides that a user who will use the terminal equipment (the television set 32) of a transmitter of the registration request information is a normal user and the available equipment (the television set 32) included in the registration request information at that time and other terminal equipment (the video tape recorder 33, the audio reproducing system 34, the personal computer 35, the printer 36 and the facsimile telephone set 37) connected to the available equipment are registered in the data base 21 as terminal equipment information in an available environment by employing the terminal equipment IDs thereof.

When the registration of the terminal equipment information in the available environment to the data base 21 is completed, the server computer 22 returns registration response information to the television set 32 as the transmitter of the registration request information to disconnect the communication path.

The television set 32 receiving the registration response information from the server computer 22 transmits the registration response information to the cellular phone 70, and then, cancels a radio communication with the cellular phone 70.

Thus, when the user inputs an instruction for the cellular phone 70 to execute a registration processing to the server within an area where the user can perform a local radio communication between the television set 32 and the cellular phone 70, the television set 32 and other terminal equipment (the video tape recorder 33, the audio reproducing system 34, the personal computer 35, the printer 36 and the facsimile telephone set 37) connected to the television set 32 through the data bus 41 are registered in the data base 21 as terminal equipment information in an available environment corresponding to the user having the cellular phone 70 at that time by the terminal equipment (the television set 32) broadcasting the identifier information proper to the network within the area.

On the other hand, in the company network system 50, a local radio interface 53T is provided in the personal computer 53. When the user transmits the registration processing designating information by the cellular phone 70 in an area in which the user can perform a local radio communication between the personal computer 53 and the user having the cellular phone 70, the personal computer 53 transmits the user ID, the terminal equipment ID of the personal computer 53 and the equipment terminal ID of the printer 54 connected to the personal computer 53 through the LAN 55 to the fire wall 51 in a manner similar to the registration sequence described above with reference to FIG. 4. Thus, the fire wall 51 can register the user IDs and the terminal equipment IDs of the personal computer 53 and the printer 54 in the data base 21 of the server system 20 as the terminal equipment information in the available environment.

Now, an explanation will be given to the configuration of each terminal equipment in the domestic network system 30 and the company network system 50 for recognizing the information of other terminal equipment in the same network system.

Figure 5:
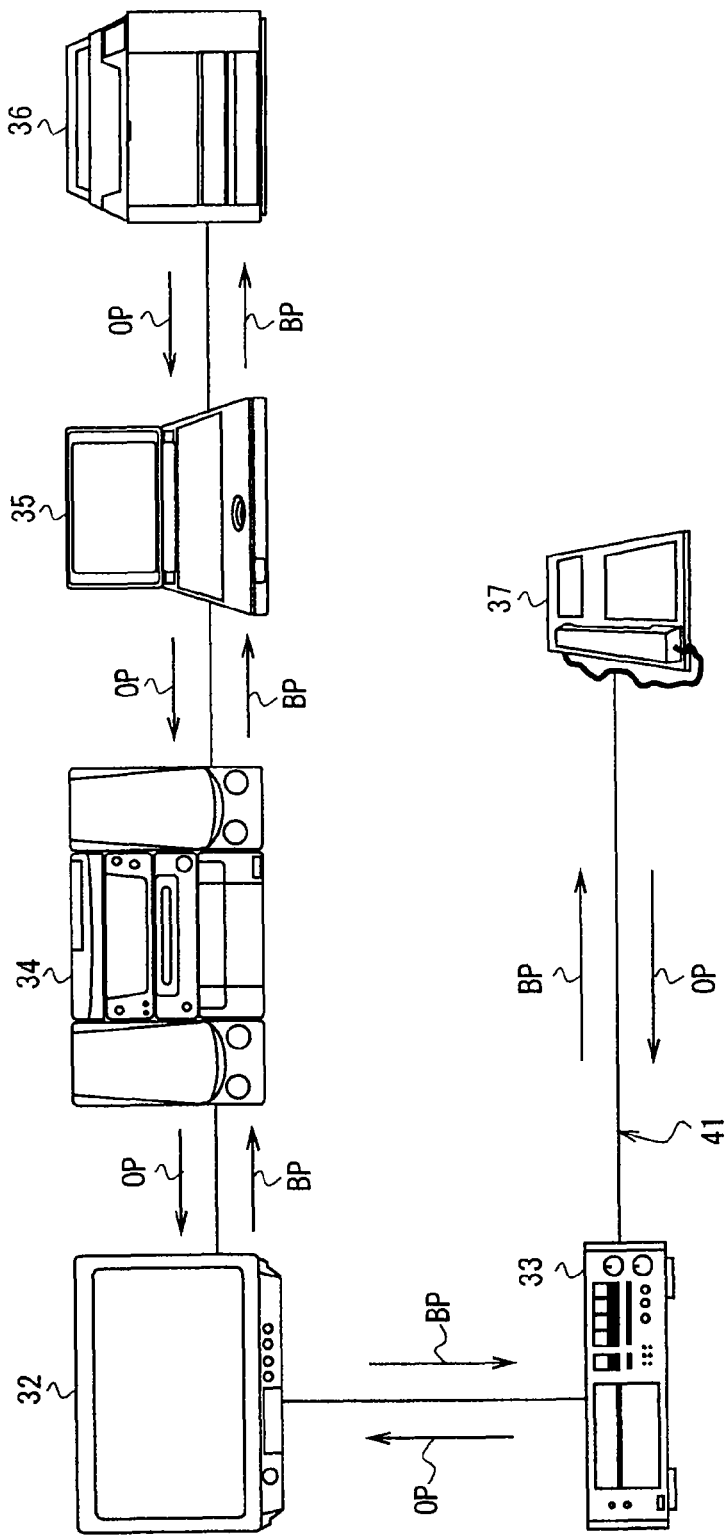
FIG. 5 is a diagrammatic view for explaining when the information of terminal equipment connected to a network are collected.

For instance, in the domestic network system 30, when the user transmits the registration processing designating information to the server system 20 through the cellular phone 70, the CPU 32A of the television set 32 having the local radio interface 32T transmits, as shown in FIG. 5, a broadcast packet BP to each of the respective terminal equipment (the video tape recorder 33, the audio reproducing system 34, the personal computer 35, the printer 36 and the facsimile telephone set 37) of the domestic system 30 connected together through the IEEE 1394 data bus 41 as a connecting information collection processing for transmitting the registration request information to the server system 20 in accordance with the registration processing designating information from the cellular phone 70. The broadcast packet BP can be recognized only by the terminal equipment which is turned on. Only the terminal equipment of the terminal equipment receiving the broadcast packets BP which are turned on and active return response packets OP to the broadcast packets BP to the television set 32 as the transmitter of the broadcast packets BP.

On the response packets OP, terminal equipment IDs are described by the control parts (CPU, etc.) of the respective terminal equipment. When the television set 32 as the transmitter of the broadcast packets BP receives the response packets OP corresponding to the broadcast packets BP, it detects a terminal equipment which is in an active state (that is to say, a usable state) at this time on the basis of the terminal equipment IDS described on the response packets OP.

In this case, the CPU 32A of the television set 32 activates an inner timer (not shown) at timing when it transmits the broadcast packets BP to the respective terminal equipment and detects only a terminal equipment which returns the response packet OP until preset and prescribed time passes. Thus, the delay of a processing due to the unreturned response packet OP can be avoided.

In such a way, the television set 32 receiving the registration processing designating information from the cellular phone 70 detects a usable terminal equipment among other terminal equipment in the domestic network system 30 connected to the television set 23, through the data bus 41, mounts the terminal equipment ID of the detected terminal equipment on the registration request information (FIG. 4) and transmits the information to the server system 20.

Further, also in the company network system 50, when the personal computer 53 having the local radio interface 53T receives the registration processing designating information from the cellular phone 70, the personal computer 53 transmits the broadcast packets BP to other terminal equipment (printer 54 or the like) connected thereto through the LAN 55 in the company network system 50, so that it can detect a terminal equipment in a usable state at this time, mount the terminal equipment ID representing the terminal equipment on the registration request information and transmit the information to the server system 20.

Here, in the network system 10 shown in FIG. 1, when the provided information (contents) is transmitted to the cellular phone 70 possessed by the user from the Internet service provider 25, the CPU 70A of the cellular phone 70 decides whether or not the received provided information can be displayed on the cellular phone 70. In this case, when a negative result is obtained, this means that the contents of the provided information (the quantity of information or the like) cannot be displayed by the display means (the display 70I and the speaker 70H) of the cellular phone 70 and the CPU 70A displays on the display 70I that a display cannot be done at this time.

The user seeing the contents of this display inputs the registration processing designating information to the server system 20 through the keyboard 70J of the cellular phone 70. Thus, the CPU 70A transmits the registration processing designating information to the television set 32 transmitting the broadcast packets BP (FIG. 5) at this time.

Thus, the registration processing sequence to the server system 20 described above with reference to FIG. 4 is carried out and the television set 32 and the terminal equipment (the video tape recorder 33, the audio reproducing system 34, the personal computer 35, the printer 36 and the facsimile telephone set 37) connected thereto in the network are registered together with the user ID of the user having the cellular phone 70 in the data base 21 of the server system 20.

The server computer 22 retrieves a terminal equipment capable of displaying the provided information to be transmitted to the user at this time on the basis of the respective functional information of these terminal equipment registered in the data base 21.

In this case, the server computer 22 transmits the information of a receiver to which the provided information is transmitted to the cellular phone 70 through the public radio network 14. Thus, the user views the information of the receiver displayed on the display 70I of the cellular phone 70, so that he can confirm which kind of equipment is provided in the terminal equipment receiving the provided information.

Here, there will be explained applications employing the network system 10 hereinafter. For example, when a user A employing the terminal equipment of the domestic network system 30 performs a communication with a user B employing the terminal equipment of another network system via the Internet, the communication is carried out on the basis of each available terminal equipment. At this time, when the user B tries to send static image data to the user A, the user A can select a method for displaying the image data from the user B on the terminal equipment of the domestic network system 30 which is being used, or a method for outputting the image data to the printer 36, a method for outputting the image data from the facsimile telephone set 37, etc. In this case, the user B may ask the server system 20 so that he can identify a group of terminal equipment of the user A in an available environment and can also transmit the data directly to the terminal equipment. In such a manner, the information can be provided depending on the status of the user.

Further, for instance, when the user A using the personal computer 53 of the company network system 50 makes a telephone call to the user B who is out, he can talk with the user B through the cellular phone 70 possessed by the user B. In this case, the talking is carried out without passing through the server system 20. Then, when the user A makes the user B view various kinds of information, the user A instructs the user B to search out output devices (terminal equipment) in the neighborhood.

The user B performs a registration request using the cellular phone 70 for the television set 32 or the facsimile telephone set 37. The terminal equipment such as the television set 32 receiving the registration request transmits a connection request to the server system 20 and registers the terminal equipment (the television set 32, or the like) which is being used and the respective terminal equipment (the video tape recorder 33, the audio reproducing system 34, the personal computer 35, the printer 36 and the facsimile telephone set 37) connected thereto in the network in the server system.

While the user A is telephoning, he specifies the terminal equipment which is being used on the Internet by the user B and the terminal equipment connected thereto in the network and transmits information to the terminal equipment. In such a manner, the user B can view the static image data via the server while talking with the user A on the telephone. In this case, the owner of the terminal equipment of the television set 32 or the facsimile telephone set 37 can perform an accounting request for the user B. Accounting data is accumulated in the data base 21 of the server system 20. The user B sends dues to the owner of the terminal equipment on the basis of the accumulated accounting information.

Further, another example of an application which utilizes the network system 10 will be described. When the cellular phone 70 of the user performs a registration to the server system 20 from a terminal equipment near it, the server system 20 can grasp the environments of the terminal equipment used by the user and the terminal equipment connected thereto in the network, etc. When the user has a cellular phone, he can directly send audio data to the cellular phone 70. Still further, in the case of data such as image data which cannot be viewed by the cellular phone 70, a prescribed message is transmitted to a display device (the display device of the television set 32 or the like) near the user. The terminal equipment receiving the message transmits the information to the cellular phone 70 which informs the user of a receiver to which the image data is transmitted by a method using sound or text data, etc. The user outputs a usage request to the terminal equipment of the receiver, hence he can view the image data. Thus, information such as the image data, so to speak, follows the user himself, and accordingly, he can receive information in a variety of places.

With the above mentioned configuration, when the user having the cellular phone 70 receives information which cannot be met by the cellular phone 70 within an area in which the user can perform a local radio communication between, for instance, the domestic network system 30 and him, the user performs a registration to the server system 20 through the cellular phone 70 and the television set 32. At this time, in the data base 21 of the server system 20, the television set 32 capable of being used by the user and the terminal equipment (the video tape recorder 33, the audio reproducing system 34, the personal computer 35, the printer 36 and the facsimile telephone set 37) are registered.

Therefore, when the Internet service provider 25 or the like tries to transmit provided information to the address of the user having the cellular phone 70 based on the user ID, the server computer 22 of the server system 20 is asked about a receiver, so that the server computer 22 selects the equipment of the receiver on which information to be transmitted can be displayed among receiver candidates registered in the data base 21. Information providing means such as the Internet service provider 25 which receives the selected result transmits the provided information to the selected terminal equipment, hence the user can view the information in the designated terminal equipment and transmit desired information.

Thus, according to the above described configuration, even when the user does not have a sufficient equipment for accepting the provided information in places where the user has departed or the like, he registers an equipment located in the neighborhood in the server system 20 so that he can transmit and receive various kinds of information by using the equipment in question.

In the above described embodiment, although there is described a case in which the user himself inputs the registration processing designating information to the cellular phone 70 to request for registration in the server system 20, it should be noted that the present invention is not limited thereto. The cellular phone 70 possessed by the user can constantly receive identifier information from the terminal equipment, the CPU 70A of the cellular phone 70 can detect the moving state of the cellular phone 70 when the identifier information changes and automatically transmits the registration processing designating information to the terminal equipment as the transmitter of identifier information lately received to perform a registration in the server system 20.

Figure 6:
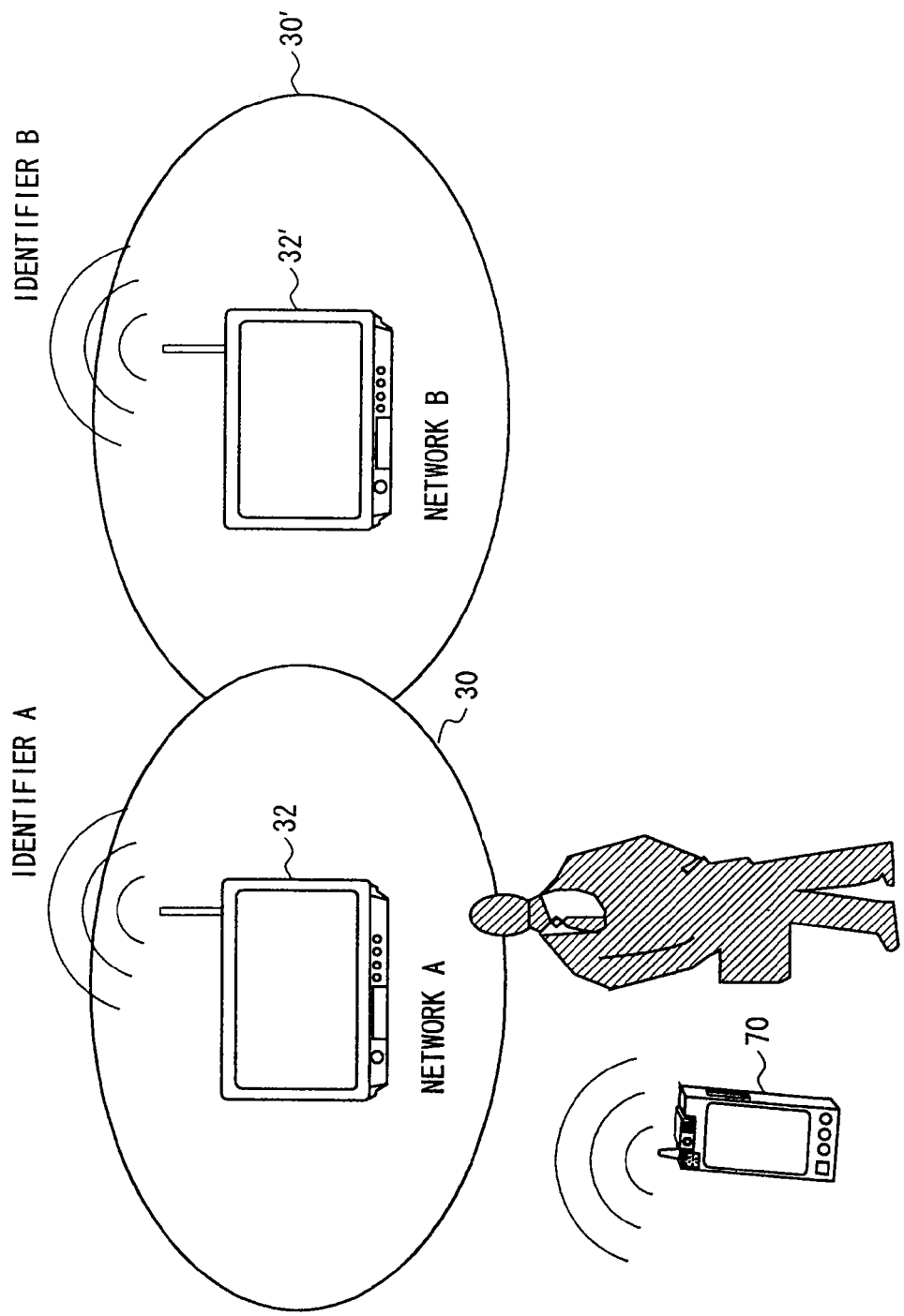
FIG. 6 is a diagrammatic view for explanation when a user is automatically detected.

In this case, for instance, as shown in FIG. 6, when a user having a cellular phone 70 which receives identifier information B from the terminal equipment 32' of a network 30' moves to enter an area in which the identifier information transmitted from the terminal equipment 32 of the network 30 can be received, the identifier information received in the cellular phone 70 is changed to the identifier information A of the network 30 to transmit the registration processing designating information to the terminal equipment 32 as the transmitter of the identifier information A. Thus, the cellular phone 70 can register the fact that the position of the cellular phone 70 is located in an area where the terminal equipment of the network 30 can be operated in the server system 20 (FIG. 1).

In this connection, when the area of the network is small, the number of communications is increased to increase wasteful communication. Therefore, the area of the network is widened and a method can be employed that a registration processing in the server system is started only when the cellular phone 70 is present in the same area for prescribed time or longer.

Figure 7:
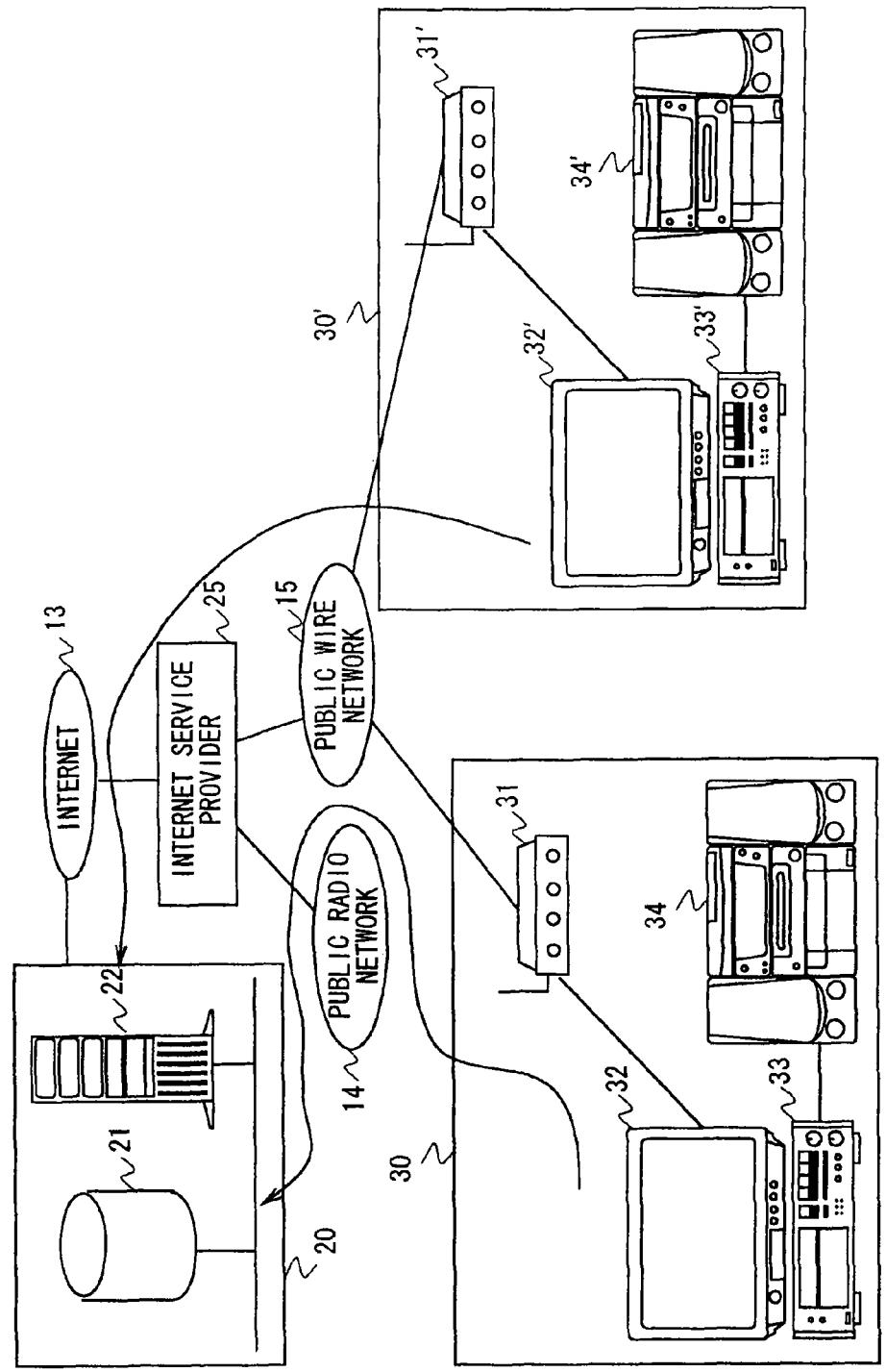
FIG. 7 is a diagrammatic view showing a method for widening the segment of a local network.

Then, in the case where the area of the network is widened, when the employed terminal equipment is initially registered in the server system 20 as illustrated in FIG. 7, the user describes and registers the address thereof. When the name of the user is temporarily registered, the server side holds the name and address of the user, and therefore, it can register the name of the user after that. The server side issues a segment address corresponding to the address of the user. The segment address indicates a subnetwork or the like in, for example, TCP/IP. The segment address constitutes area information. A terminal address is added to the segment address to carry out a communication. In such a way, is realized an address system for controlling an object and a space to which information and positional information peculiar to the terminal equipment are added.

In this case, the area (segment) of the network is widened, hence the user performs a registration on the basis of a network unit by the method described above with reference to FIG. 4, and then, registers the information of the terminal equipment used by himself in the server system 20 through the terminal equipment. Thus, the server computer 22 of the server system 20 can specify the terminal equipment employed by the user even when one network system is set within a wide range.

In the above described embodiment, although there is described a case in which the user freely employs the terminal equipment of another person, needless to say, the present invention is not limited thereto. An access can be restricted by using usable conditions for each terminal equipment.

Figure 8A:
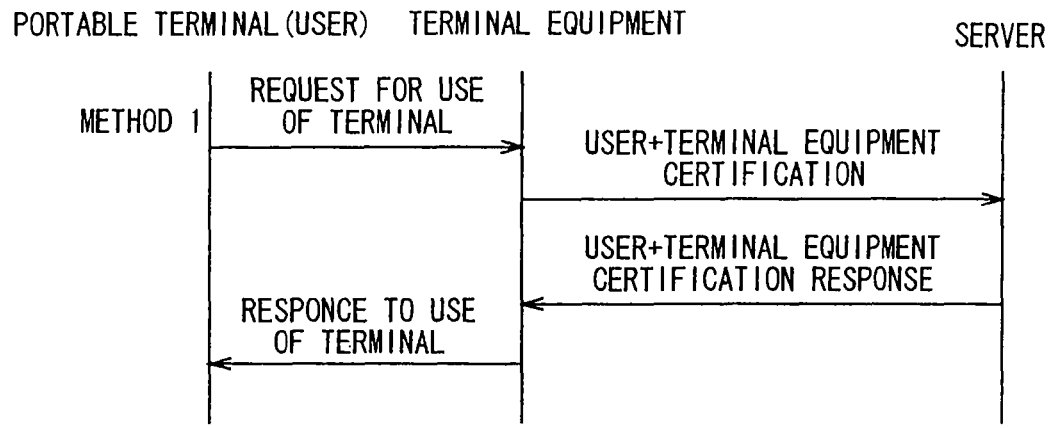
FIGS. 8A and 8B are diagrammatic views showing a security sequence.
Figure 8B:
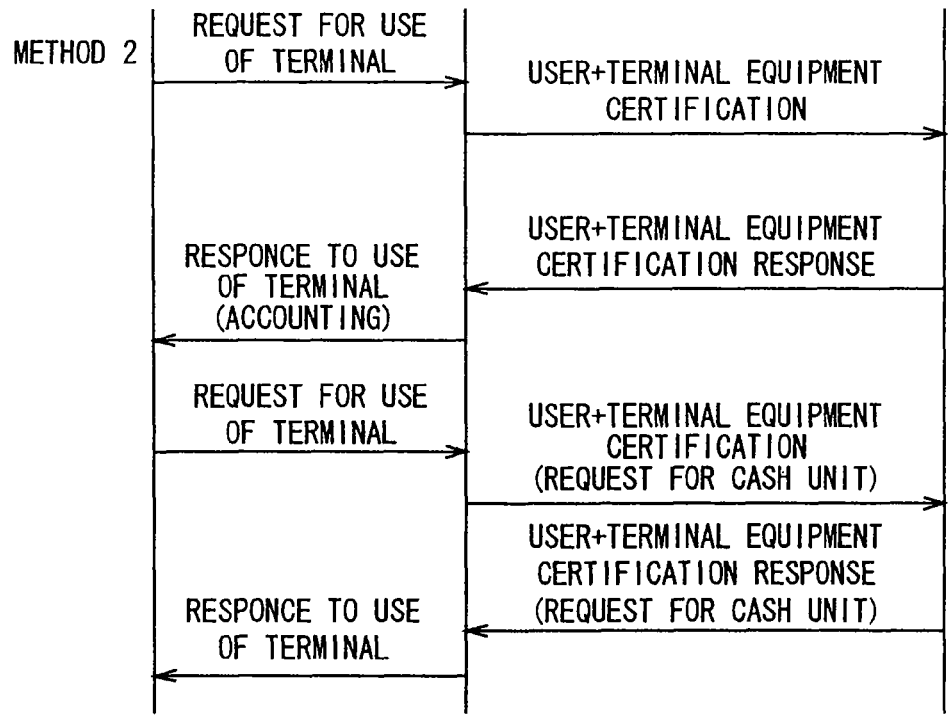

In this instance, two communication protocols between the terminal equipment and the cellular phone 70 and between the terminal equipment and the server are used properly. Specifically, as shown in FIG. 8A, the terminal equipment receiving a connection request from the user (the cellular phone 70) requests the server system 20 to certify whether or not the user is an illegal user. When the user is the illegal user, the server system 20 rejects the use of the terminal equipment. If the user is a proper user, its use will be continued. Further, as shown in FIG. 8B, the server system 20 can be requested an accounting in case of use of the terminal equipment.

For instance, in the case where a fee of 10 yen/minute is set to the server system 20, the owner of the terminal equipment requests an accounting of a price higher than a prescribed amount of money to the cellular phone 70.

The user understanding the fee continuously carries out a processing and performs the processing up to that time. An access restriction for the user is realized by an application in the server system 20, so that a simultaneous control can be done. In this case, as a method for realizing the access restriction in the server side, after the user is certified by, for example, the Common Gateway Interface (CGI) of World Wide Web (WWW), access restriction items may be changed. In this case, the cellular phone 70 can perform a registration in the server system 20 without using the communication interface 31 (FIG. 1) of the domestic network.

Figure 9:
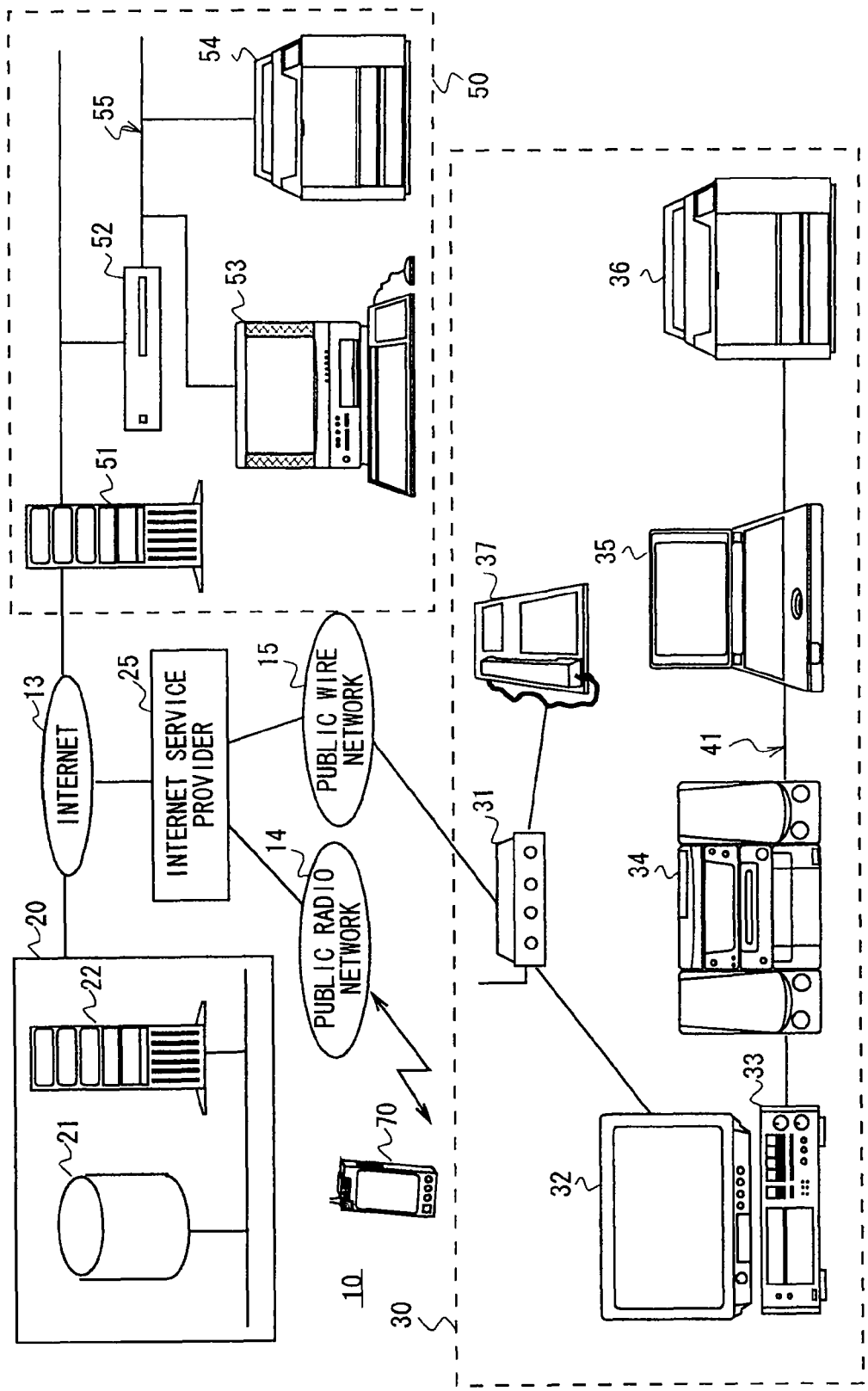
FIG. 9 is a diagrammatic view showing an entire configuration when a terminal equipment used by the user is registered in a server from a cellular phone.

Further, in the above described embodiment, although there is described a case in which the terminal equipment used by the user is registered in the server system 20 through the domestic network system 30 or the company network system 50, it should be noted that the present invention is not limited thereto, and a registration request can be transmitted directly to the server system 20 through the public radio network 14 from the cellular phone 70, as shown in FIG. 9.

Figure 10:
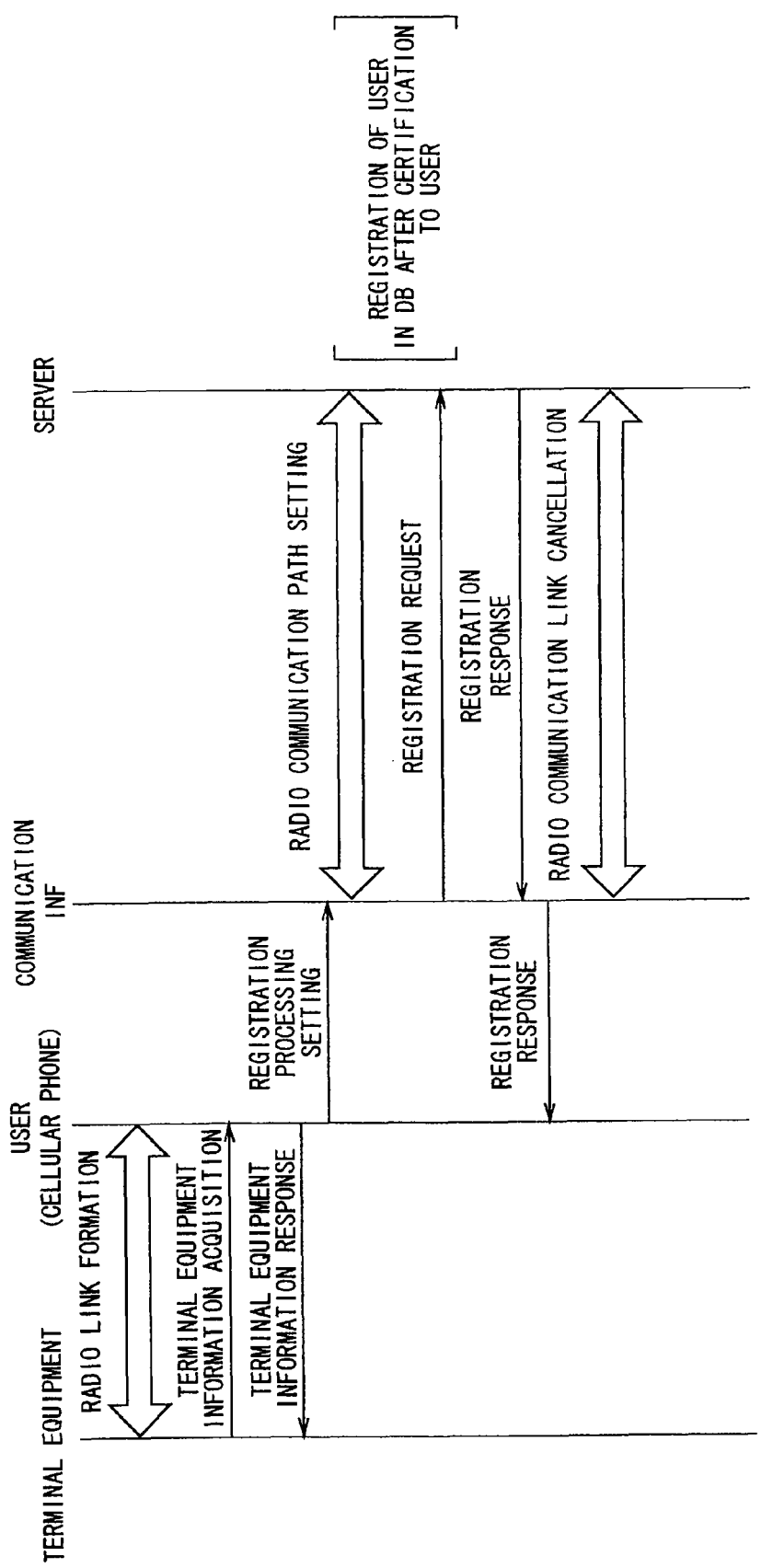
FIG. 10 is a diagrammatic view showing a registration sequence in the server.

In this case, since the domestic network system 30 is not connected to a public line, the cellular phone 70 performs a communication with the terminal equipment and the server system 20. FIG. 10 shows a sequence thereof. The user forms a radio link between the terminal equipment and the cellular phone by using the cellular phone 70 to transmit terminal equipment information obtaining request to the terminal equipment. Then, the cellular phone 70 which gets the terminal equipment information sends the registration processing designating information including the terminal equipment information to the communication interface 31 (FIG. 1).

The communication interface 31 which receives the registration processing designating information sets a radio communication path between the server system 20 and the interface to transmit a registration request to the server system 20. The server system 20 which registers the terminal equipment therein in accordance with the registration request returns a registration response to the cellular phone 70 through the communication interface 31. Thus, the terminal equipment employed by the user is registered in the data base 21 of the server system 20.

Figure 11:
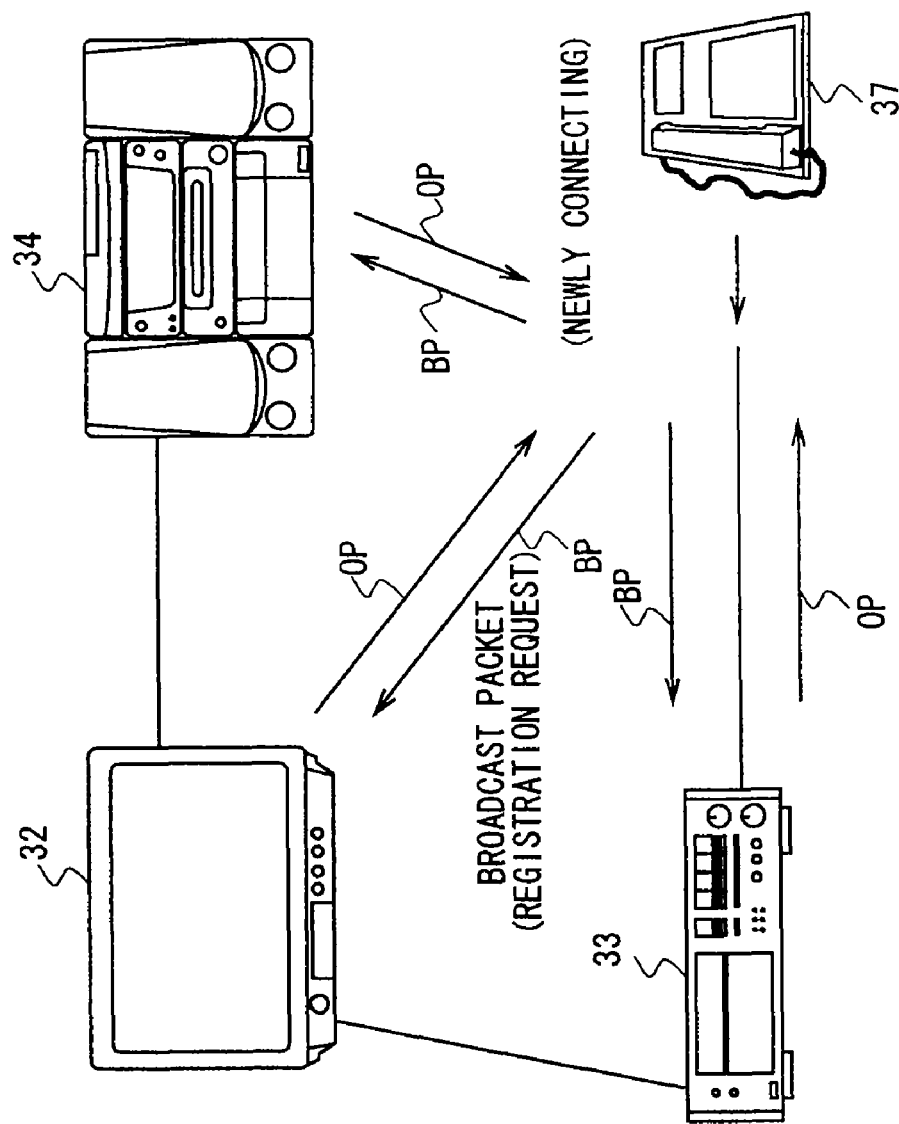
FIG. 11 is a diagrammatic view showing the registration processing of the pieces of terminal equipment.

Further, in the above described embodiment, although, when the registration request is transmitted to the server system 20 in the terminal equipment of the domestic network system 30 or the company network system 50, other terminal equipment connected to the terminal equipment are detected by broadcasting the broadcast packets BP (FIG. 5), needless to say, the present invention is not limited thereto. The IDs of terminal equipment connected to the same network can be recorded in the terminal equipment in the network system as shown in, for instance, FIG. 11. In this case, when the terminal equipment (for example, the facsimile telephone set 37 in FIG. 11) is newly connected to the network or a connection terminal is pushed or pulled out in case of movement of the terminal equipment, a broadcast packet BP indicating that the terminal equipment is newly (or again) connected to the network is brodcasted to other terminal equipment connected to the network. Then, the terminal equipment that hold the information of the respective terminal equipment connected to the network receive the broadcast packets BP among other terminal equipment connected to the network and return response packets OP. In this instance, one terminal equipment can hold the information of other terminal equipment. Still further, a plurality of terminal equipment can hold the information of other terminal equipment.

Still further, in the above described embodiment, although there is described a case in which the terminal equipment of the network system existing in the vicinity of the user is registered in the server system 20 by using the cellular phone 70, it should be recognized that the present invention is not limited thereto. For instance, a memory card as external storing means peculiarly possessed by the user can be employed.

Figure 12:
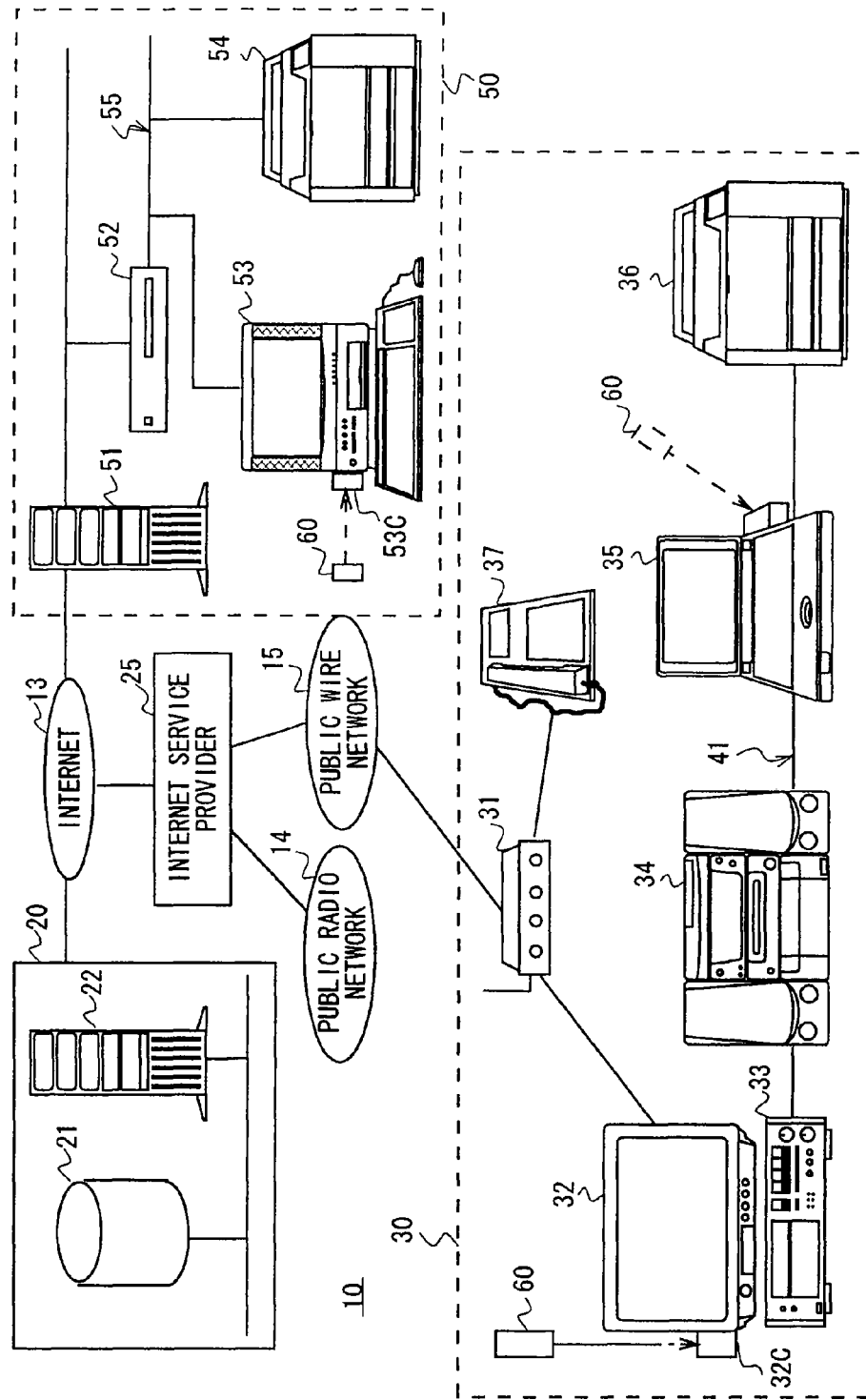
FIG. 12 is a diagrammatic view showing a network system using a memory card.

In this case, as illustrated in FIG. 12 in which parts corresponding to those in FIG. 1 are designated by the same reference numerals, a part or all of the terminal equipment (for instance, the television set 32 and the personal computer 35) of the terminal equipment connected together in the domestic network system 30 and a part or all of the terminal equipment (for instance, the personal computer 53) of the terminal equipment connected together in the company network system 50 are provided with memory card interfaces 32C, 35C and 53C. The user connects a memory card 60 possessed by himself to the terminal equipment (the television set 32, the personal computer 35 or the personal computer 53) which exists in the vicinity of the user at that time, so that the terminal equipment to which the memory card 60 is connected performs a registration request to the server system 20.

Figure 13:
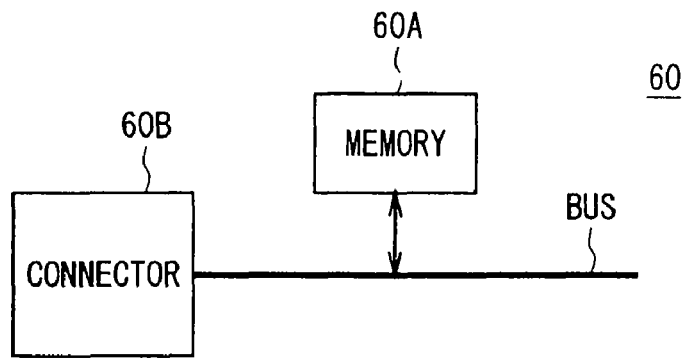
FIG. 13 is a block diagram showing the configuration of the memory card.

More specifically, as shown in FIG. 13, the memory card 60 comprises a connector 60B mounted on the slot of each terminal equipment and a memory 60A connected to the connector 60B through a bus.

Figure 14:
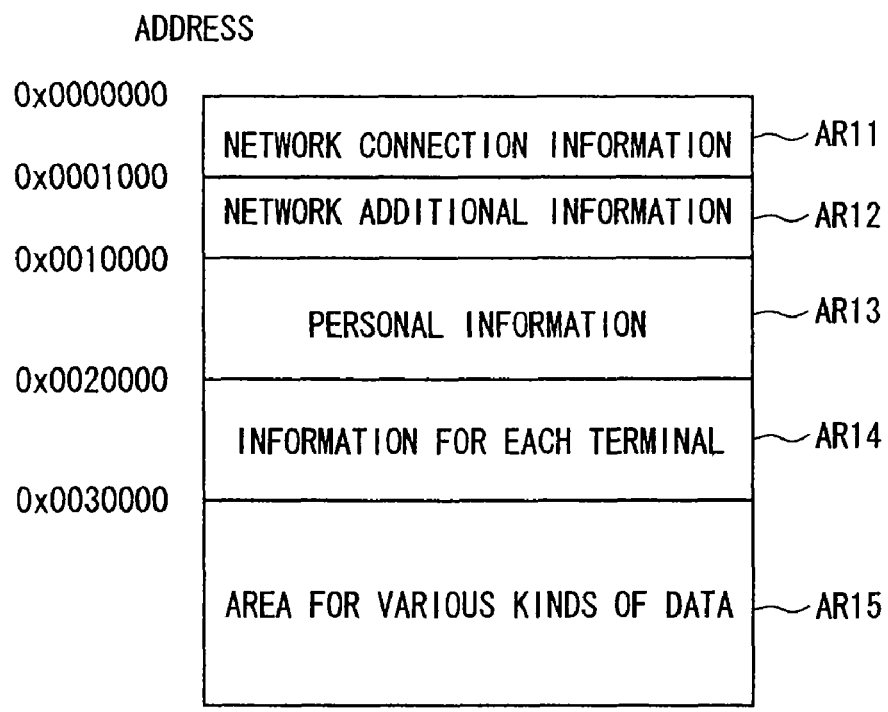
FIG. 14 is a diagrammatic view showing the memory map of the memory card.

The memory 60A is adapted to store various kinds of information peculiar to the user having the memory card 60 in areas designated by a memory map shown in FIG. 14. More specifically, a first area AR11 of the storing areas of the memory 60A is an area for storing network connection information for connecting the terminal equipment with the memory card 60 mounted to the network, and is designed to store a user ID and a password to be certified by the Internet service provider 25 and a password for identifying the user which is previously registered by the user employing the memory card 60. The password for identifying the user means information to be compared with a password inputted by the user at thig time every time the user mounts the memory card 60 on the terminal equipment, and is employed in order to decide whether the user at that time is a proper user who employs the memory card 60.

Further, a second area AR12 is an area for storing additional information downloaded when a variety of services (provision of information) are received on the network from, for instance, the Internet service provider 25 by utilizing the terminal equipment on which the memory card 11 is mounted.

Still further, a third area AR13 is an area for storing information inherent in the user having the memory card 60 such as an address book, schedule data, etc.

Still further, a fourth area AR14 is an area for storing usable information for each terminal equipment with the memory card 60 mounted. For instance, a television program schedule used when the terminal equipment on which the memory card is mounted is the television set 32, Uniform Resource Locator (URL) information for viewing an explanation on the World Wide Web (WWW) for each television program, a sentence being edited which is read and written, a screen or data such as a program which is being developed when the terminal equipment on which the memory card 60 is mounted is the personal computer 35 are respectively stored.

Still further, a fifth area AR15 is an area for storing various kinds of data of a static image or the like. Data stored in the memory 60A of such a memory card 60 is stored in a Type Length Value (TLV) format shown in, for instance, FIG. 15. This format indicates the format of the data stored in the respective areas (AR11 to AR15) of the memory map described above with reference to FIG. 14. The format is composed of TYPE information D11, data LENGTH information D12 and VALUE information D13 of the data stored for each area (AR11 to AR15).

In this case, as the TYPE information of the data of the first area AR11 of the memory 60A, a code "00" representing network connection information is assigned. As the VALUE information D13 of the first area AR, information such as certification ID (user ID) and a password, etc. is stored. Then, the format of a TLV form is further generated for each of the certification IDs or the passwords stored as the VALUE information D13 and respectively forms TYPE information D13A, data LENGTH information D13B and VALUE information D13C.

Further, in the second area AR12 of the memory 60A, a code "01" representing network additional information is assigned as the TYPE information D11 of the data. As the VALUE information of the second area AR12, is stored information such as a group ID and the password thereof as additional information down-loaded when various kinds of services (provision of information or the like) are received on the network from the Internet service provider 25. The group ID is identifying information utilized when a plurality of users employing the terminal equipment form a specific group. Then, the format of a TLV form is further generated for each of group IDs and passwords thereof stored as the VALUE information D13 and respectively forms TYPE information D13A, data LENGTH information D13B and VALUE information D13C.

Still further, in the third area AR13 of the memory 60A, a code "02" expressing personal information is assigned as the TYPE information D11 of data. As the VALUE information of the third area AR13, information such as the data of a telephone directory, an address book and personal schedule data, etc. which are peculiarly employed by the user having the memory card 60 is stored. Then, the format of a TLV form is further generated for each of the data of the telephone directory, the address book and the personal schedule data, etc. and respectively forms TYPE information D13A, data LENGTH information D13B and VALUE information D13C.

Still further, in the fourth area AR14 of the memory 60A, as the TYPE information D11 of data, a code "03" representing information for each terminal is assigned. As the VALUE information of the fourth area AR14, information such as the attributes of various kinds of terminal equipment is stored as information used for each terminal equipment on which the memory card 11 is mounted. Then, the format of a TLV form is further generated for each information such as the attributes of various kinds of terminal equipment stored as the VALUE information D13, and respectively forms TYPE information D13A, data LENGTH information D13B and VALUE information D13C.

Furthermore, in the fifth area AR15 of the memory 60A, various kinds of data arbitrarily read and written are stored as the TYPE information D11 of data. Then, the format of a TLV form is further generated for each of the various kinds of data stored as the VALUE information D13, and respectively forms TYPE information D13A, data LENGTH information D13B and VALUE information D13C.

As described above, in the memory card 60, the characteristic information (a certified ID, a password, etc.) for specifying the user having the memory card 60 and various kinds of information (personal information, information for each terminal equipment, etc.) peculiarly used by the user are stored. When the user operates each terminal equipment, he mounts the memory card 60 on an operation terminal equipment so that he informs the Internet service provider 25 of network connection information (the certified ID, the password, etc.) as the characteristic information for specifying him through the operation terminal equipment. The Internet service provider 25 is designed to register the coordinate relation between the user and the terminal equipment operated by the user at that time in the data base 21 through the server computer 22 of the server system 20.

Figure 16:
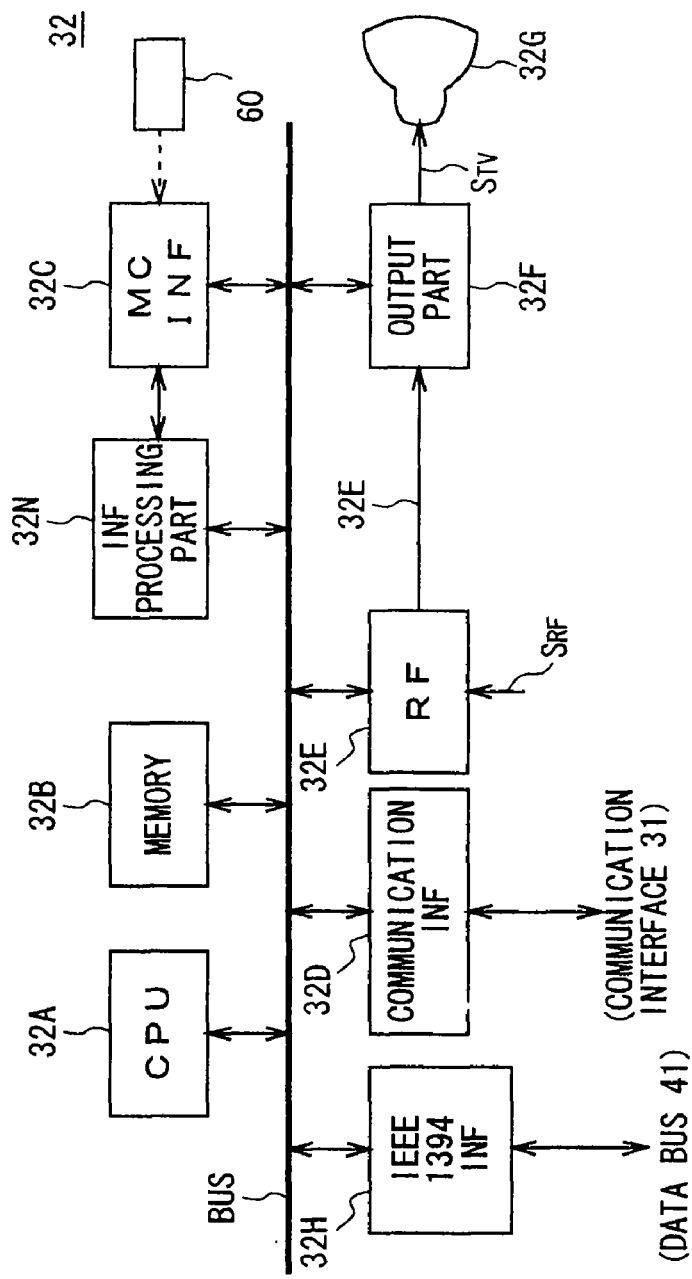
FIG. 16 is a block diagram showing the configuration of a television set having a memory card interface.

As shown in FIG. 16 in which parts corresponding to those in FIG. 3 are denoted by the same reference numerals, the television set 32 has a memory card interface 32C for connecting the memory card 60. When the user employing the television set 32 mounts the memory card 60 on a slot for the memory card (not shown), a contact for detecting the memory card 60 is connected to the contact of the memory card interface 32C, so that an interface processing part 32N detects the change (change from logic "L" level to logic "H" level) of a signal level (from logic "L" level to logic "H" level). Thus, the interface processing part 32N transmits an interrupt signal to the CPU 32A to perform an interrupt processing. Thus, the CPU 32A detects the connection of the memory card 60. In this connection, the interface processing part 32N is a processing block for performing a protocol processing on the basis of an interface specification in transmitting data to and receiving it from the memory card 60. Thus, the interface processing part 32N is brought to a state in which it can read information peculiar to the user stored in the memory card 60.

The memory card interface 32C is composed of a serial interface and has at least three data lines. A first data line transmits a clock signal upon transmission of data. A second data line transmits a status signal necessary upon transmission of data. A third data line serially transmits data written in and read from the memory card 60.

Then, the CPU 32A reads the data in the memory card 60 through the memory card interface 32C and transmits it to the server computer 22 of the server system 20 through the communication interface 32D, the communication interface 31 (FIG. 12), the public wire network 15 (FIG. 12) and the Internet service provider 25 to carry out a registration request to the server computer 22.

Figure 17:
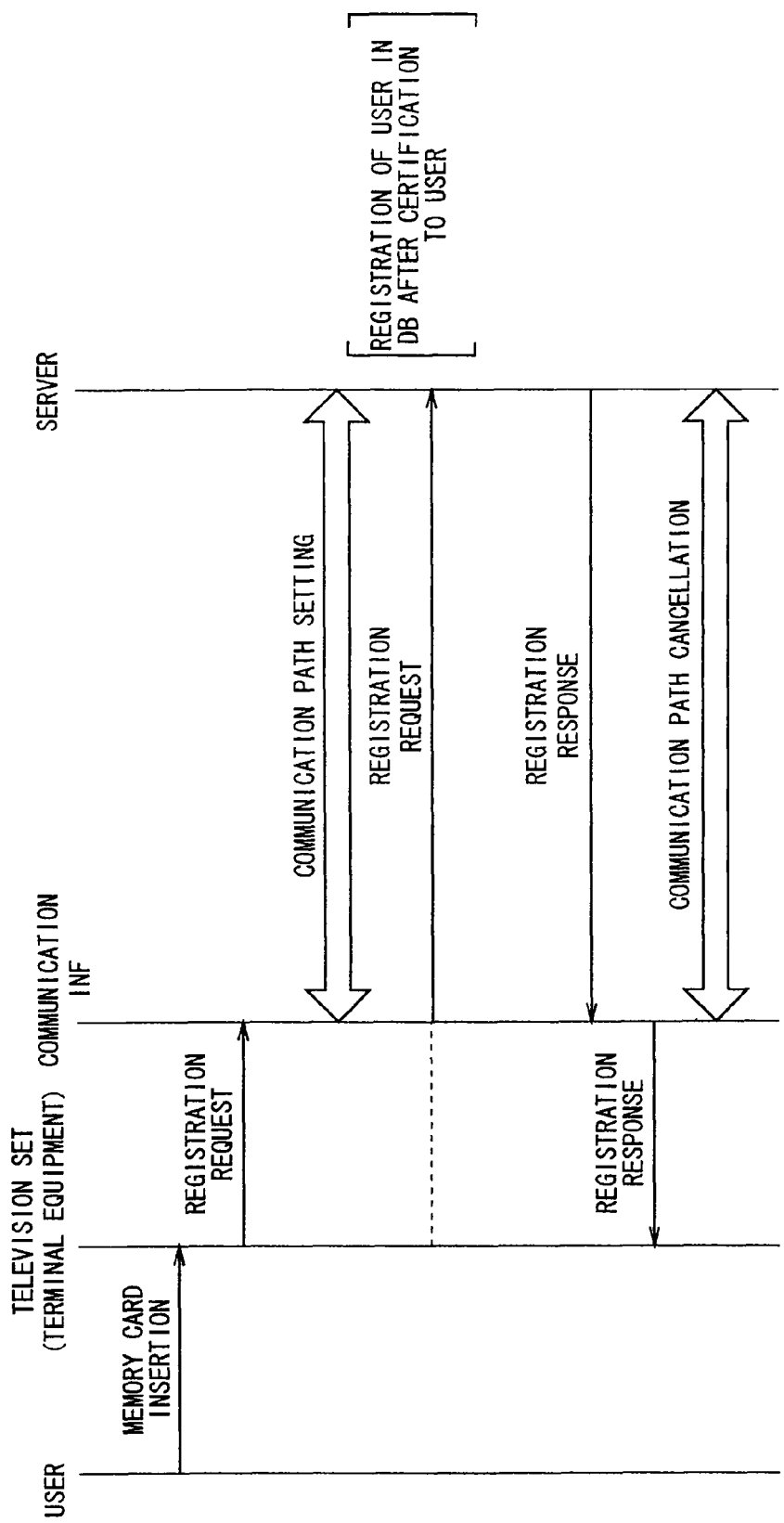
FIG. 17 is a diagrammatic view showing a registration sequence to the server.

A sequence of the registration request is shown in FIG. 17. In FIG. 17, when the user inserts the memory card 60 into the terminal equipment near the user, for instance, the television set 32, the CPU 32A of the television set 32 transmits a user ID, a password read from the memory card 60, a terminal equipment ID peculiar to the television set read from the memory 32B of the television set 32, terminal equipment IDs which represent other terminal equipment (the video tape recorder 33, the audio reproducing system 34, the personal computer 35, the printer 36 and the facsimile telephone set 37) connected to the television set 32 in the network through the data bus 41 and a registration request including information representative of the data processing capacity each terminal equipment and address information to the interface 31. The information (the terminal equipment IDs) of other terminal equipment connected together in the network is collected by the method using the broadcast packets BP described above with reference to FIGS. 5 and 11.

In FIG. 17, the communication interface 31 which receives the registration request sets a communication path between the server system 20 and the interface 31, and then, transmits the registration request to the server system 20. In the registration request are included the user ID, the password, the terminal equipment ID peculiar to the television set, terminal equipment IDs representative of other terminal equipment (the video tape recorder 33, the audio reproducing system 34, the personal computer 35, the printer 36 and the facsimile telephone set 37) connected to the television set 32 in the network through the data bus 41 and the information indicative of the data processing capacity of the respective terminal equipment or the address information.

The server computer 22 of the server system 20 which receives the registration request registers the contents of the registration request in the data base, then returns a registration response to the television set 32 through the communication interface and cancels the communication path.

Thus, in the data base 21 of the server system 20, the information of the terminal equipment (the television set 32) employed by the user and the terminal equipment connected thereto in the network are registered. For instance, when prescribed provided information (contents) is transmitted to the user from the Internet service provider 25, the Internet service provider 25 temporarily retrieves the terminal equipment (for example, the television set 32) registered in the server system 20 so as to meet the user and transmits the provided information to the network system including the terminal equipment.

In this case, the server computer 22 selects the terminal equipment having a capability for displaying the provided information among a group of terminal equipment connected to the television set 32 in the network on the basis of the quantity of the provided information used for transmission and transmits the provided information to the terminal equipment thus selected. Further, the server computer 22 transmits information indicative of the terminal equipment serving as the receiver of the provided information to the terminal equipment (the television set 32) to which the user connects the memory card 60 at that time, and informs the user of the receiver of the provided information. Thus, the user employs the terminal equipment as the receiver of the provided information so that he can receive the provided information from the Internet service provider 25 or the like.

Further, in the above described embodiment, although there is described a case in which the memory card 60 is inserted into each of the terminal equipment of the domestic network system 30 or the company network system 50 and the terminal equipment used by the user is registered in the server system 20, needless to say, the present invention is not limited thereto. The memory card 60 can be inserted into the cellular phone 70.

Figure 18:
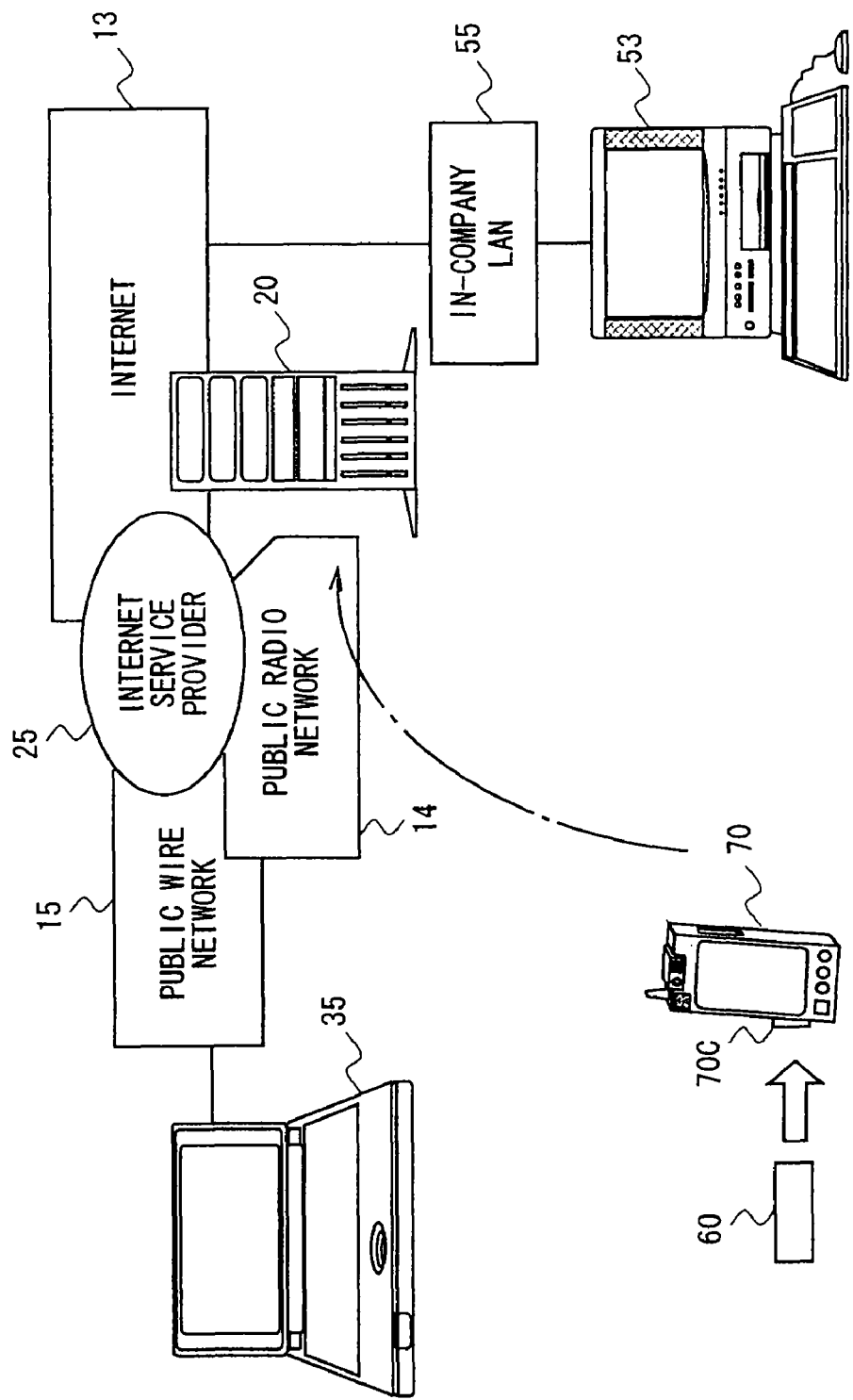
FIG. 18 is a diagrammatic view for explaining the decision of a transmission path when information is transmitted from the terminal equipment of a transmitter to the terminal equipment of a receiver.

In this instance, in FIG. 18 in which parts corresponding to those in FIG. 12 are denoted by the same reference numerals, the cellular phone 70 is provided with a memory card interface 70C. When the memory card 60 is inserted into the memory card interface 70T, the type, the telephone number, the electronic mail address, the function, or the like of the equipment which is being used by the user (in this case, the cellular phone 70) are up-loaded in the server system 20. Thus, the server system 20 can control the equipment (for instance, the cellular phone 70) used by the user, the functions of the terminal equipment, a method for connecting it to the user, or the like.

In this case, the user using the cellular phone 70 or other terminal equipment initially connects the memory card 60 peculiarly possessed by the user to the terminal equipment such as the cellular phone 70 used by the user at that timed, so that each user registers the terminal equipment used by himself in the server system 20.

Figure 19:
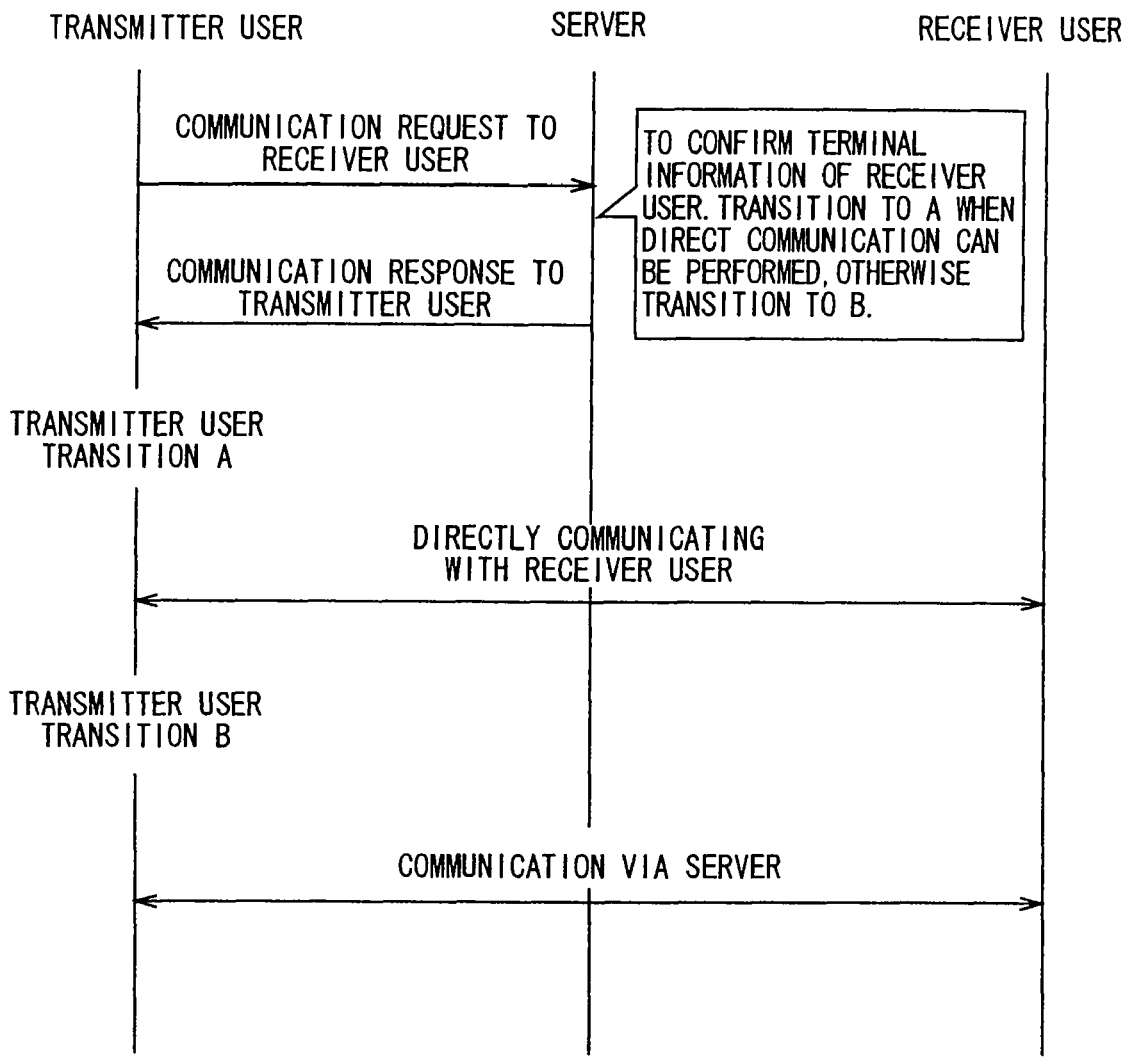
FIG. 19 is a diagrammatic view showing a sequence for determining the transmission path at the time of transmitting information from the terminal equipment of the transmitter to the terminal equipment of the receiver.

Under this state, as shown in FIG. 19, a transmitter user initially asks the server system 20 about a terminal equipment currently employed by a receiver user with which the transmitter user tries to communicate and a connection method to the terminal equipment. For instance, in the case where the receiver user desires a response through the cellular phone of the receiver user, when the transmitter and receiver users have the terminal equipment of the same capacity, a communication via the server system 20 is not necessary. Therefore, the server system 20 sends to the transmitter user a response that a direct communication can be performed.

In this case, the terminal equipment (for instance, the cellular phone 70) employed by the transmitter user temporarily disconnects a link with the server system 20 and newly performs a processing for calling the receiver user on the phone. At this time, the cellular phone 70 of the transmitter user automatically establishes a communication session to the receiver user, so that the transmitter user looks as if he could communicate with the receiver user in accordance with a series of processings. In this case, in the case where the server system 20 is provided in a telephone exchange system, a processing for transmitting information from the cellular phone 70 of the transmitter user to the cellular phone of the receiver user is omitted and a communication with the cellular phone of the receiver user is established by the exchange system.

As described above, the transmitter user directly communicates with the receiver user without passing through the server system 20, hence the processing load of the server system 20 is reduced.

Further, when the receiver user employs the personal computer 35 (or 53), the transmitter user who employs the cellular phone 70 requires an information converting process in the server system 20 upon transmission of information.

Accordingly, in this case, the server system 20 processes a transmission from the transmitter user as a communication via the server system 20 and informs the transmitter user that the receiver user employs the personal computer and data can be received only by mail.

The transmitter user recognizes the information displayed on the cellular phone 70 so that he switches to a communication method suitable for the transmission by mail and sends the information. In this connection, in place of a method in which the transmitter user switches to a communication method suitable for the terminal equipment used by the receiver user, the server system 20 can, for example, convert audio data to text data to transmit the text data to the terminal equipment used by the user, or can add the audio data to the text data to transmit the data thus added to the terminal equipment used by the receiver user.

Thus, even when the terminal equipment used by the receiver user is, for example, the personal computer, the receiver user can receive information from the transmitter user through the terminal equipment used by the user without employing the telephone set.

Here, a response message from the server system 20 is formed on the basis of a Hyper Text Markup Language (HTML) or a Compact-HTML, an HDML (Wireless Application Protocol (WAP)) so as to meet various kinds of terminal equipment. According to the hyper text language for a portable terminal, a tag for connecting the cellular phone as a telephone set or a facsimile is specified. However, in the hyper text language, a processing instruction for directly telephoning does not exist. Accordingly, in the terminal equipment such as the cellular phone 70 is provided a command set for directly telephoning or performing a mail process in the hyper text language received from the server system 20.

For instance, information such as LDirecttelTo >03-1111-2222</DirectTelTO>is presented to the terminal equipment such as the cellular phone 70 from the server system 20, and accordingly, the information can be processed in the cellular phone 70 and the receiver user can be directly called on the phone. Further, if the transmitter user has information to be transmitted by mail, information such as <DirectMailTo>abcde@fgh.com</DirectMailTo>is supplied to the cellular phone 70 from the server system 20. At this time, contents or voice inputted by the transmitter user is subjected to a mail processing and transmitted to a mail server.

As mentioned above, response data from the server system 20 is converted into the hyper text language, hence while a communication processing is performed, the text or image data can be displayed on the portable terminal equipment and an effective user interface is achieved.

In this connection, in FIG. 18, the terminal equipment used by the user is not limited to the cellular phone 70 and various kinds of other terminal equipment can be employed. In addition, a manual input or a radio input from other equipment can be carried out in place of the memory card 60.

Further, in the above described embodiment, although the network system 10 employs the portable terminal equipment (cellular phone 70 (FIG. 1)) having a telephone function, it should be noted that the present invention is not limited thereto. A variety of portable terminal equipment having the registering function described above with reference to FIG. 4, in place of the cellular phone 70.

Still further, in the above described embodiment, although there is described a case in which the server system 20 and the Internet service provider 25 are independently provided, needless to say, the present invention is not limited thereto. They can be integrally formed.

As described above, according to this embodiment, the information of the terminal equipment used by the user among the terminal equipment connected to the network is registered in prescribed registering means and the transmission path from the terminal equipment of a transmitter to the terminal equipment of a receiver is determined, so that the information can be assuredly transmitted to the terminal equipment of the receiver in the transmission path suitable for the information without the consciousness of the user.

Further, according to the present invention, the information of terminal equipment used by a user and terminal equipment connected to the terminal equipment used by the user among terminal equipment connected to the network is registered in prescribed registering means together with information for identifying the user as available environmental information, and provided information is transmitted to terminal equipment specified by the registered available environmental information. Accordingly, the environment of the terminal equipment used by the user can be readily grasped. Therefore, the provided information can be assuredly transmitted to the users present in various terminal environments.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication system for exchanging information, comprising: an interface unit communicatively coupled to a first, a second and a third network; a server communicatively coupled to the first network; a plurality of terminal units communicatively coupled to the third network; and at least one mobile unit communicatively coupled directly to the second network and also communicatively coupled directly to at least one terminal unit by a separate communication path, wherein, at least one of the mobile units is configured to gather information characterizing each of the terminal units directly from each terminal unit and to communicate the information characterizing each of the terminal units to the server via the interface unit, the server is configured to register the information sent from at least one of the mobile units characterizing each of the terminal units and to search the third network via the interface unit for a terminal unit configured to output content sent to the terminal unit and the separate communication path between the at least one mobile unit and the at least one terminal unit is determined based on the registered information with the server; wherein said registered information comprises address information and capability information of said one of more terminal units, said server searches said suitable terminal units according to said capability information, and said server transmits said content to said suitable terminal unit according to said address information.

2. The information controller communication system according to claim 1, wherein said server reports said suitable terminal unit to said interface unit.

3. An information controller comprising: an interface unit in communication with a first, a second and a third network; a registering unit in communication with the first network and configured to register information characterizing the interface unit and one or more terminal units connected to said interface unit via the third network; a searching unit configured to search for a suitable terminal unit which can output a content sent to said interface unit in said network; and at least one mobile unit in direct communication with the second network and also in direct communication with at least one terminal unit by a separate communication path, wherein, each mobile unit is configured to gather information characterizing at least one terminal units directly from each terminal unit and to communicate the information to the server via the interface unit and the separate communication path between the at least one mobile unit and the at least one terminal unit is determined based on the registered information with the registering unit; wherein: said registered information comprises address information and capability information of said one or more terminal equipments, said searching unit searches said suitable terminal units according to said capability information, and said interface transmits said content to said suitable terminal according to said address information.

4. The information controller according to claim 3, further comprising a reporting unit configured to report a suitable the terminal unit to the searching unit.

* * * * *